US012621275B2

(12) United States Patent
Parthasarathi et al.

(10) Patent No.: US 12,621,275 B2
(45) Date of Patent: May 5, 2026

(54) SYSTEM AND METHOD TO CONTROL ACCESS OF ULTRA-WIDEBAND (UWB) DEVICES

(71) Applicant: NXP B.V., Eindhoven (NL)

(72) Inventors: Srivathsa Masthi Parthasarathi, Bangalore (IN); Sreenivasaiah Hanumapura Venkateshaiah, Ramanagara (IN); Michael Stark, Gleisdorf (AT); Pablo Corbalán Pelegrín, Alicante (ES)

(73) Assignee: NXP B.V., Eindhoven (NL)

( * ) Notice: Subject to any disclaimer, the term of this patent is extended or adjusted under 35 U.S.C. 154(b) by 190 days.

(21) Appl. No.: 18/596,935

(22) Filed: Mar. 6, 2024

(65) Prior Publication Data

US 2025/0193157 A1     Jun. 12, 2025

(30) Foreign Application Priority Data

Dec. 12, 2023    (IN) ............................. 202341084716

(51) Int. Cl.
*H04L 9/40*                (2022.01)

(52) U.S. Cl.
CPC ...... *H04L 63/0428* (2013.01); *H04L 63/0869* (2013.01); *H04L 63/10* (2013.01)

(58) Field of Classification Search
CPC .. H04L 63/0428; H04L 63/0869; H04L 63/10
USPC ......................................................... 726/27
See application file for complete search history.

(56) References Cited

U.S. PATENT DOCUMENTS

| | | | | |
|---|---|---|---|---|
| 7,174,456 | B1 * | 2/2007 | Henry ................. | H04W 12/069 |
| | | | | 713/168 |
| 9,306,905 | B2 | 4/2016 | Bidare | |
| 11,272,363 | B2 | 3/2022 | Medwed et al. | |
| 11,368,844 | B2 * | 6/2022 | Chastain ................. | G06F 21/72 |
| 11,405,185 | B2 | 8/2022 | Sierra et al. | |
| 11,412,373 | B2 | 8/2022 | Medwed et al. | |
| 2016/0065370 | A1 * | 3/2016 | Le Saint ................. | H04L 9/321 |
| | | | | 713/155 |
| 2021/0360395 | A1 * | 11/2021 | Lemsitzer ............... | H04W 4/06 |
| 2022/0256338 | A1 * | 8/2022 | Parthasarathi .......... | H04W 4/80 |
| 2022/0369103 | A1 * | 11/2022 | Han ...................... | H04L 9/0838 |
| 2023/0013613 | A1 * | 1/2023 | Kim .................... | H04W 12/069 |

(Continued)

FOREIGN PATENT DOCUMENTS

EP               4044636 A1      8/2022

*Primary Examiner* — Dant B Shaifer Harriman

(57)            ABSTRACT
An ultra-wideband (UWB) system of a user device is disclosed. The UWB system receives a session identifier associated with a first session key from an access control device to facilitate an access control operation for the user device. Based on successful mutual authentication between the user device and the access control device, a secure data exchange session is scheduled between the user device and the access control device based on the first session key and a second session key that is generated by a secure element of the user device. First transaction payloads that include the session identifier are received from the access control device during the secure data exchange session. The first transaction payloads are decrypted by way of a ranging payload set, to generate second transaction payloads. The access control operation is executed based on the second transaction payloads.

20 Claims, 13 Drawing Sheets

(56)  References Cited

U.S. PATENT DOCUMENTS

| | | | | |
|---|---|---|---|---|
| 2023/0117010 A1* | 4/2023 | Kang | ..................... | H04W 4/80 |
| | | | | 455/456.1 |
| 2023/0124498 A1* | 4/2023 | Agrawal | ................ | G06F 21/57 |
| | | | | 713/194 |
| 2023/0394897 A1* | 12/2023 | Schlicht | ............. | G07C 9/00309 |
| 2023/0403142 A1* | 12/2023 | Ishiguro | ................. | H04L 9/085 |
| 2025/0142332 A1* | 5/2025 | Parthasarathi | ........ | H04W 12/08 |
| 2025/0193157 A1* | 6/2025 | Parthasarathi | .......... | H04L 63/10 |

* cited by examiner

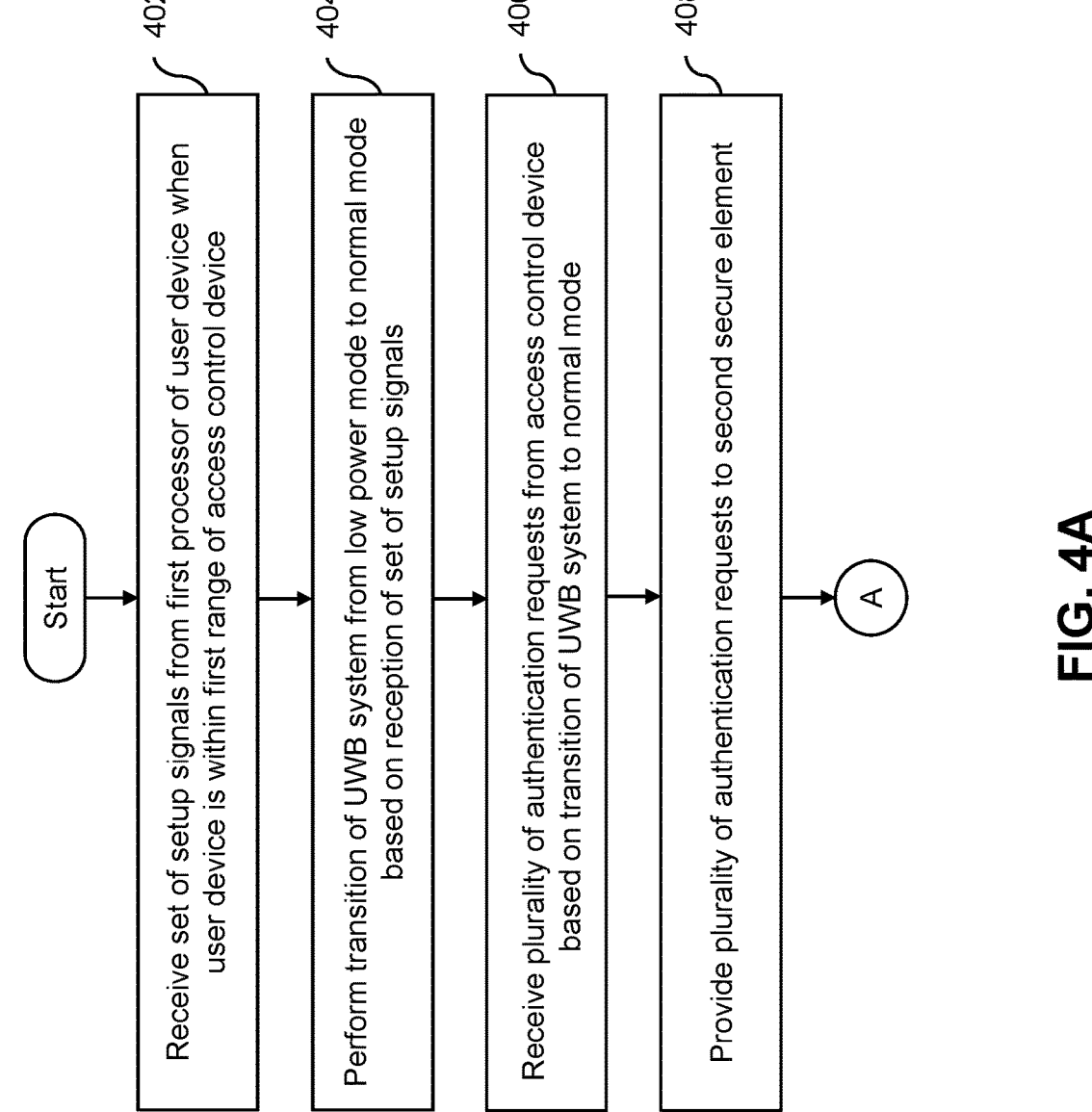

400

Start

Receive set of setup signals from first processor of user device when user device is within first range of access control device
402

Perform transition of UWB system from low power mode to normal mode based on reception of set of setup signals
404

Receive plurality of authentication requests from access control device based on transition of UWB system to normal mode
406

Provide plurality of authentication requests to second secure element
408

410 Receive plurality of authentication responses from second secure element based on plurality of authentication requests 412 Receive status signal from access control device based on transmission of plurality of authentication responses to access control device 413 Generate query signal based on status signal 415 Provide query signal to second secure element

400

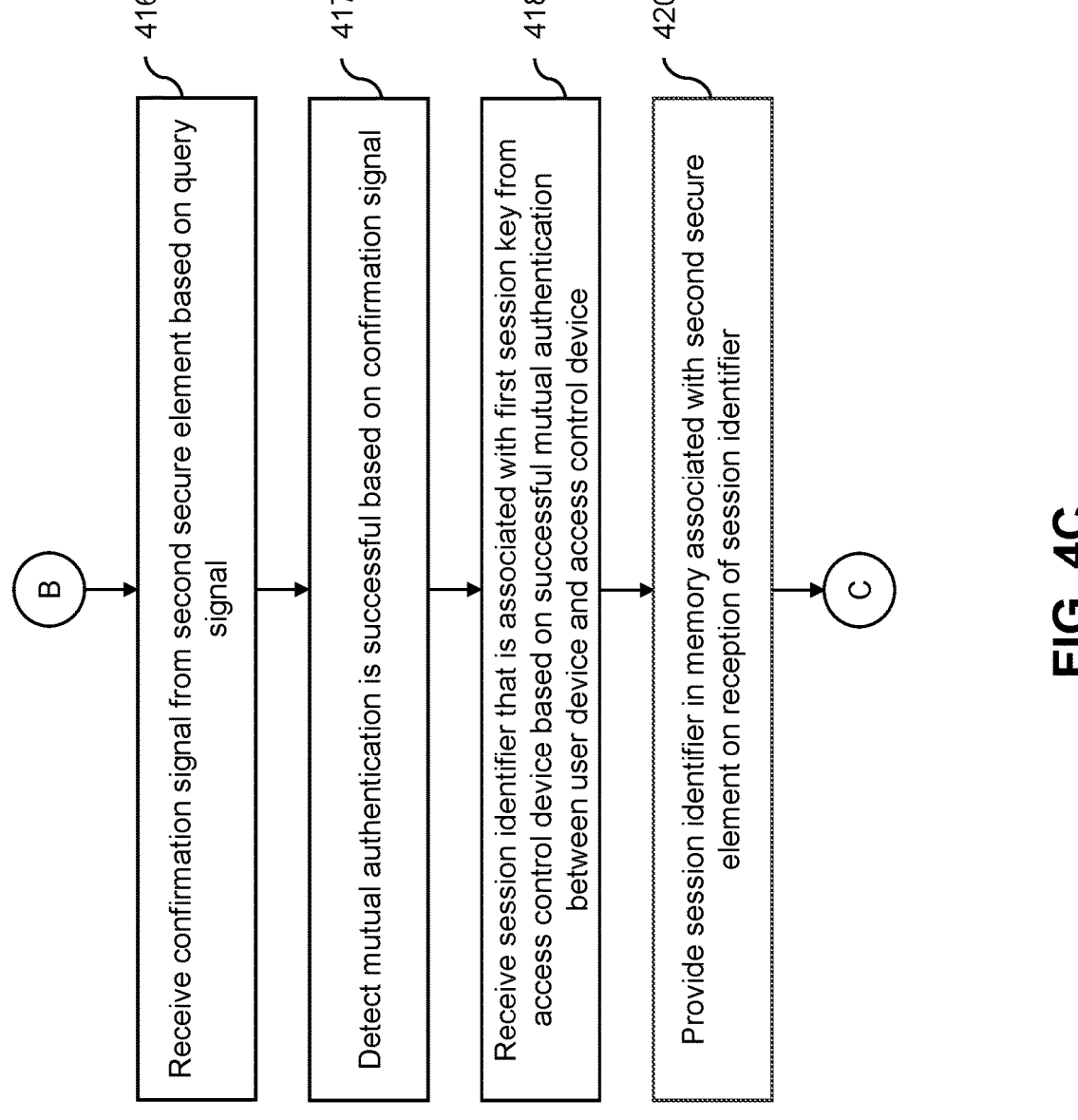

416

Receive confirmation signal from second secure element based on query signal

417

Detect mutual authentication is successful based on confirmation signal

418

Receive session identifier that is associated with first session key from access control device based on successful mutual authentication between user device and access control device

420

Provide session identifier in memory associated with second secure element on reception of session identifier

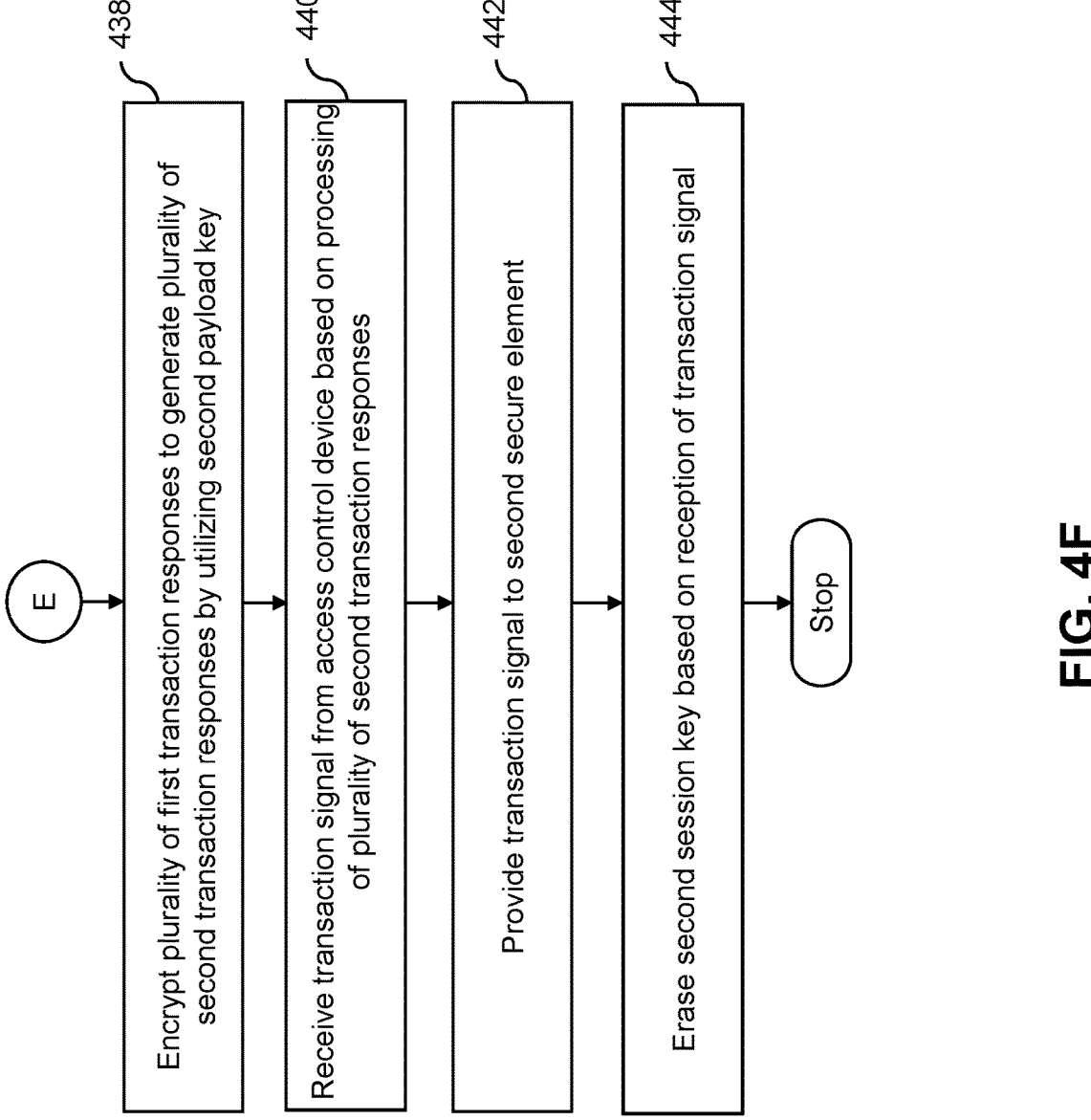

400

438 Encrypt plurality of first transaction responses to generate plurality of second transaction responses by utilizing second payload key 440 Receive transaction signal from access control device based on processing of plurality of second transaction responses 442 Provide transaction signal to second secure element 444 Erase second session key based on reception of transaction signal Stop

FIG. 4F

SYSTEM AND METHOD TO CONTROL ACCESS OF ULTRA-WIDEBAND (UWB) DEVICES

CROSS-REFERENCE TO RELATED APPLICATION

This application claims priority under 35 U.S.C. § 119 to Indian patent application no. 202341084716, filed 12 Dec. 2023, the contents of which are incorporated by reference herein.

FIELD OF USE

The present disclosure relates generally to wireless communication and, more particularly, to a system and a method for controlling access of an Ultra-wideband (UWB) device.

BACKGROUND

Ultra-wideband (UWB) devices utilize low-energy, short-range communication, and larger bandwidths for interacting with other UWB devices. UWB devices are widely implemented in public transport systems such as metro stations to provide access to users to avail the public transport. In a scenario, a user utilizes a metro line to travel between two metro stations. To gain access to the metro line, the user may utilize a communication device having a UWB chip and a host processor external to the UWB chip, to communicate with a UWB access control device that is implemented at an entrance of the metro station. The UWB access control device initiates an access control operation to provide access to the user when a distance of the communication device is detected to be within a predefined range from the UWB access control device. The UWB access control device generates session tokens to facilitate the access control operation. However, the access control operation requires the session tokens to be typically routed via the host processor, resulting in a delay in providing access to the user.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIGS. 4A-4F represent a flowchart that illustrates a UWB communication method executed by the user device and the access control device of the UWB environment of FIG. 1, in accordance with an embodiment of the present disclosure.

DETAILED DESCRIPTION

Figure 1:
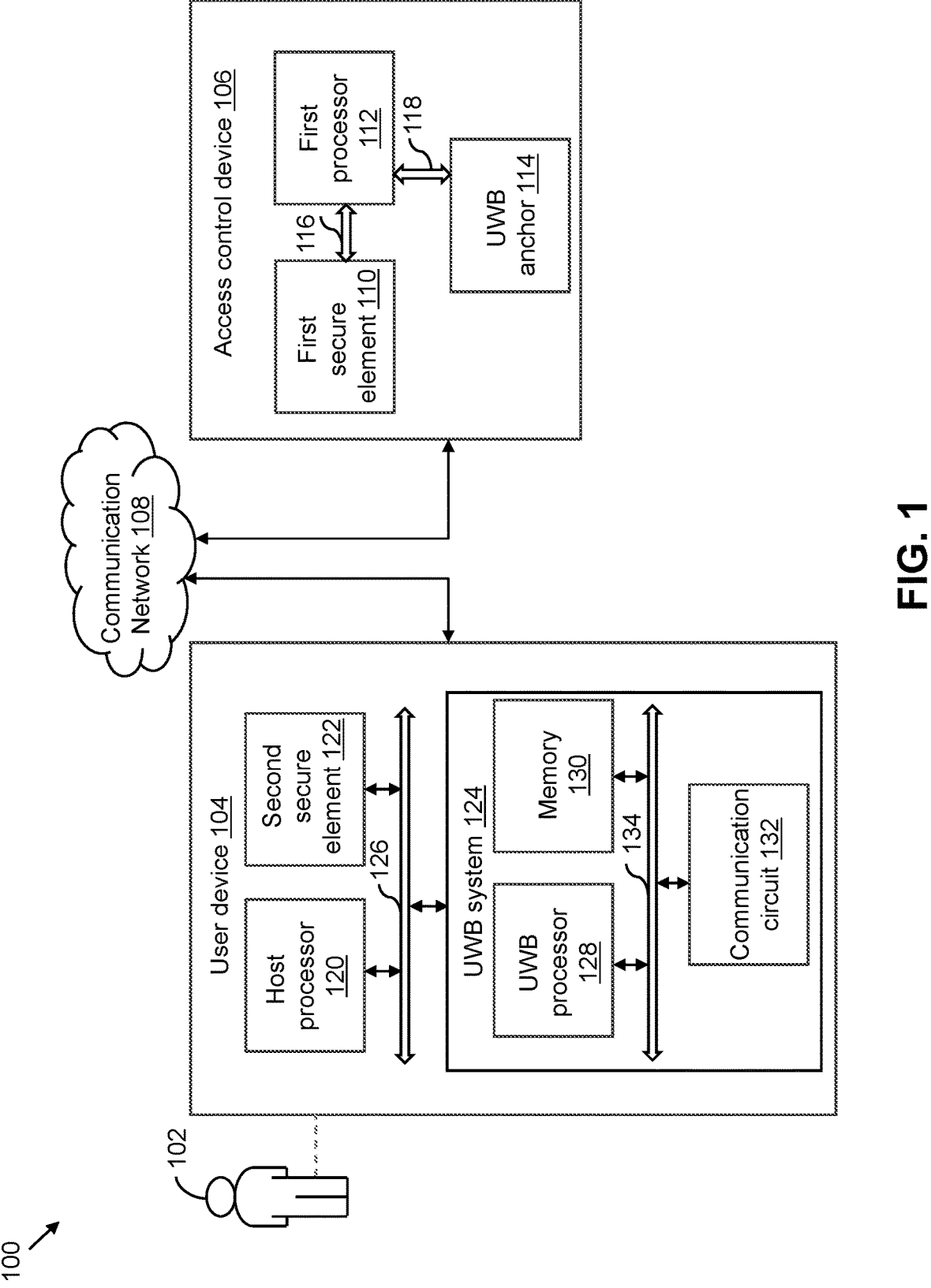
FIG. 1 illustrates a schematic diagram of an ultra-wideband (UWB) environment, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

An access control device detects a presence of a user device of a user utilizing higher bandwidth technologies such as ultra-wideband (UWB) and initiates an access control operation based on the detection. A host processor of the user device communicates with the access control device during the access control operation. The access control device generates session tokens to facilitate the access control operation. However, the access control operation requires the session tokens to be typically routed via the host processor, resulting in a delay in providing access to the user. Further, the host processor may prompt the user to perform certain tasks before executing the access control operation.

Various embodiments of the present disclosure disclose a UWB system of a user device. The user device may further include a processor and a secure element. When the user device is within a first range of the access control device, the UWB system may receive a plurality of authentication requests to facilitate a mutual authentication between the user device and the access control device. A plurality of authentication responses based on the plurality of authentication requests may be generated by the secure element to execute the mutual authentication between the user device and the access control device.

Upon successful mutual authentication between the user device and the access control device, a first session key may be generated by the access control device, and a second session key may be generated by the secure element. Further, the UWB system may receive a session identifier from the access control device and provide the session identifier associated with the first session key to the secure element. The UWB system may schedule a secure data exchange session between the user device and the access control device when the user device is detected to be within a transaction area of the access control device. The secure data exchange session may be scheduled based on the first session key and the second session key. During the secure data exchange session, the UWB system may receive a plurality of first transaction payloads from the access control device. Based on the reception of the plurality of first transaction payloads, the UWB system may request a ranging payload set from the secure element. The ranging payload set may include the second session key and the session identifier. The UWB system may decrypt each of the plurality of first transaction payloads to generate a plurality of second transaction payloads. Further, based on the plurality of second transaction payloads, an access control operation may be executed by the access control device for the user device.

In the UWB communication technique of the present disclosure, the access control device may transmit the plurality of authentication requests when the user device is within the first range of the access control device. Further, the UWB communication technique of the present disclosure may utilize the UWB system and the secure element of the user device to provide the plurality of authentication responses to the access control device to facilitate mutual authentication of the access control device and the user device. Based on the successful mutual authentication, the access control device may generate the plurality of first transaction payloads. Further, based on the plurality of first transaction payloads, the access control device may determine when the user is within the transaction area to execute the access control operation. As the access control operation is executed based on the determination that the user device is within the transaction area, a need for generating any prompts to confirm the intent of the user for the access control operation is eliminated thereby allowing a seamless user experience. Additionally, the access control device may directly interact with the UWB system, thereby the involvement of the host processor is minimized for the access control operation. Further, the UWB communication technique of the present disclosure eliminates overhead functions associated with the host processor resulting in a substantial reduction in the time required for the access control operation and thereby significantly improving the user experience. Additionally, the host processor may be available to handle additional tasks of the user device.

FIG. 1 illustrates a schematic diagram of an ultra-wideband (UWB) environment 100, in accordance with an embodiment of the present disclosure. UWB communication may be a type of wireless communication that involves the transmission of data between devices using a broad frequency band and short-duration, low-energy pulses. Unlike standard wireless communication systems, which work within specified frequency bands, UWB devices may broadcast signals over a wide frequency range, generally reaching several gigahertz (GHz). An example of the wide frequency range may be 3.1 GHz to 10.6 GHz.

The UWB environment 100 may include a user 102 and a user device 104 associated with the user 102. The user device 104 may be a UWB communication device. Examples of the user device 104 may include a mobile device, a smartphone, a smartwatch, a tablet, a phablet, a smart key, a smart card, or the like.

The UWB environment 100 may further include one or more service providers (not shown). A service provider may be a company, an organization, an establishment, or the like, that may offer one or more services to the user 102. Examples of service providers may include city metros, libraries, hotels, banks, or the like. Further, examples of the services offered by the service providers may include city metros offering transportation services, libraries offering book lending services, hotels offering room access, banks offering financial services, or the like.

The service provider may establish infrastructure to facilitate provision of the one or more services to the user 102. The infrastructure may thus implement various functions such as user authentication, transaction authorization, user access, or the like. The infrastructure may include at least one access control device to regulate the one or more services. For example, the UWB environment 100 may further include an access control device 106 of a first service provider to regulate the services hereof, respectively. Further, the user device 104 may facilitate communication with the access control device 106. The access control device 106 may be a UWB communication device. Examples of the access control device 106 may include an access control terminal, a fare collection terminal, a kiosk, a point-of-sale (POS) terminal, or the like. Further, although FIG. 1 illustrates that the UWB environment 100 includes one access control device (e.g., the access control device 106), the scope of the present disclosure is not limited to it. In other embodiments, the service provider infrastructure may include more than two access control devices, without deviating from the scope of the present disclosure.

The user 102 may thus avail the services offered by the first service provider by way of the corresponding access control devices. For example, when the first service provider corresponds to a city metro, the user 102 (e.g., the user device 104) may be required to pass through fare collection terminals (e.g., the access control device 106) to avail the transportation service offered by the first service provider. In such a scenario, at the time of entry to or exit from a metro platform at the metro station, the user device 104 and the access control device 106 may communicate (e.g., exchange data) to enable the user 102 to enter or exit the metro platform.

The UWB environment 100 may further include a communication network 108. The user device 104 may communicate with the access control device 106 by way of the communication network 108. Examples of the communication network 108 may include the Internet, a local area network (LAN), a wide area network (WAN), or the like.

Access Control Device 106:

The access control device 106 may include suitable circuitry that may be configured to perform one or more operations. For example, the access control device 106 may communicate with the user device 104 to deduct fare from a financial account of the user 102. The circuitry of the access control device 106 may include a first secure element 110, a first processor 112, and a UWB anchor 114. The first secure element 110, the first processor 112, and the UWB anchor 114 may communicate with each other by way of a first communication channel 116 and a second communication channel 118. Examples of the first communication channel 116 and the second communication channel 118 may include a serial peripheral interface (SPI), an inter-integrated channel (12C), or the like.

First Secure Element 110:

The first secure element 110 may include suitable circuitry that may be configured to perform one or more operations. For example, the first secure element 110 may be configured to store first cryptographic data that may be utilized during a mutual authentication between the user device 104 and the access control device 106. The first cryptographic data may include details pertaining to the authentication of the access control device 106 (such as an identifier of the access control device 106).

First Processor 112:

The first processor 112 may include suitable circuitry that may be configured to perform one or more operations such as an access control operation. The access control operation may be executed to control an access of the user device 104. An example of the access control operation may include allowing the user 102 to access a public transportation service based on the deduction of fare from a financial account of the user 102 by way of the user device 104. The access control device 106 may communicate with the user device 104 to execute the access control operation. To execute the access control operation, various requests, messages, data, signals, and responses may be generated by either of the user device 104 and the access control device 106. For the sake of simplicity of explaining the ongoing description, the examples provided with each of the requests, messages, data, signals, and responses generated by either of the user device 104 and the access control device 106 are associated with deduction of the fare for availing public transportation (e.g., the access control operation). However, the scope is not limited to it. In various other embodiments, the messages, requests, data, signals, and responses generated by either of the user device 104 and the access control device 106 may be indicative of other exemplary scenarios and will be understood by a person skilled in the art.

The first processor 112 may be configured to generate a setup message when the user device 104 is detected to be within a first range of the access control device 106. The first range may be a predetermined area of the access control device 106 such that the access control device 106 may detect the presence of any device (e.g., the user device 104) within the first range. In an exemplary embodiment, the first range may be 50 square meters (m²). The setup message may include information related to a configuration of communication parameters between different entities. For example, the setup message may include a UWB frequency range such that the access control device 106 may communicate within the UWB frequency range. The setup message may be a bluetooth low energy (BLE) message, or the like. The first processor 112 may be further configured to transmit the setup message by way of a communication circuit (not shown) of the access control device 106 to the user device 104. The user device 104 may be configured to perform a transition of the UWB system 124 from a low power mode to a normal mode based on the reception of the setup message.

The first processor 112 may be further configured to initiate the mutual authentication between the access control device 106 and the user device 104. The mutual authentication may be executed between the user device 104 and the access control device 106 to ensure that identities of both the user device 104 and the access control device 106 are trusted and verified before initiating the execution of the access control operation. The mutual authentication is performed by exchanging various requests and responses between the access control device 106 and the user device 104.

The first processor 112 may be thus configured to generate a plurality of authentication requests to initiate the mutual authentication process. The plurality of authentication requests may be a set of requests (based on the first cryptographic data) to confirm an identity of the access control device 106 and may further include a set of queries to receive authentication data from the user device 104 to authenticate the user device 104 in the mutual authentication process. Further, the plurality of authentication requests may be generated based on detection of the user device 104 within the first range of the access control device 106. In an embodiment, the first processor 112 may be further configured to generate the plurality of authentication requests when the user device 104 is within a transaction area of the access control device 106. Further, the transaction area may cover less area compared to the first range of the access control device 106. For example, the transaction area may be 1.5 m² around the access control device 106 and the first range may be 50 m². Additionally, the access control operation may be executed by the access control device 106 for the user device 104 when the user device 104 is within the transaction area. The first processor 112 may be further configured to transmit the plurality of authentication requests to the user device 104 by way of the UWB anchor 114.

The plurality of authentication requests may be utilized by the user device 104 to authenticate the access control device 106. The first processor 112 may be further configured to receive a plurality of authentication responses from the user device 104 by way of the UWB anchor 114. The plurality of authentication responses may be transmitted by the user device 104 based on the plurality of authentication requests. The plurality of authentication responses may include a set of responses to confirm an identity of the user device 104 based on the set of queries included in the plurality of authentication requests. The first processor 112 may be further configured to authenticate the user device 104 based on the plurality of authentication responses.

The first processor 112 may be further configured to generate a first session key based on successful authentication of the user device 104. In an embodiment, the first session key may be a first master key. The first master key is a cryptographic key that may be utilized to derive or generate other cryptographic keys such as a first payload key. The first payload key may be generated to secure the communication between the access control device 106 and the user device 104 for an ongoing session such as the UWB communication session between the access control device 106 and the user device 104. The first payload key may be utilized in various operations such as encryption and decryption of various messages explained in the ongoing description. The first session key may be generated to facilitate the access control operation for the user device 104. The first processor 112 may be configured to generate a status signal based on processing of the plurality of authentication responses (e.g., verifying the responses included in the plurality of authentication responses). The first processor 112 may be further configured to transmit the status signal to the user device 104 by way of the UWB anchor 114. The user device 104 may be further configured to detect that the mutual authentication between the user device 104 and the access control device 106 is successful based on the status signal. In an event that the mutual authentication fails, the access control device 106 may re-initiate the mutual authentication for finite attempts.

The first processor 112 may be further configured to generate a session identifier based on successful mutual authentication of the user device 104 and the access control device 106. In an embodiment, the session identifier may be a unique token assigned to a specific communication session, thereby enabling the access control device 106 to manage and differentiate multiple concurrent communication sessions, such as the communication session with the user device 104, efficiently. For example, the session identifier may be a sequence of alphanumeric characters that aid the access control device 106 to identify the user device 104 for the ongoing session to initiate the execution of the access control operation. In an embodiment, the first payload key may be generated based on a cryptographic algorithm whose inputs are the first session key and the session identifier. The first session key may be associated with the session identifier.

The first processor 112 may be further configured to transmit the session identifier to the user device 104 by way of the UWB anchor 114. Based on the transmission of the session identifier, the first processor 112 may be further configured to generate and provide a plurality of first transaction requests to the UWB anchor 114. The first processor 112 may generate the plurality of first transaction requests based on the detection of the user device 104 in the transaction area of the access control device 106. The plurality of first transaction requests may be a set of requests to initiate the access control operation. The plurality of first transaction requests may be indicative of information requested by the access control device 106 from the user device 104. For example, the plurality of first transaction requests may be indicative of a request to receive account details of the user 102 for deducting a fare of the transaction or the like. Each of the plurality of first transaction requests may include the session identifier.

The first processor 112 may be further configured to receive a plurality of second transaction responses that may be generated based on a plurality of first transaction payloads by the user device 104. The plurality of first transaction payloads may be an encrypted version of the plurality of first transaction requests. Further, the plurality of second transaction responses may be an encrypted version of a plurality of first transaction responses. The user device 104 may generate the plurality of first transaction responses based on the plurality of first transaction payloads. The plurality of first transaction responses may include details associated with the information requested in the plurality of first transaction payloads. For example, the plurality of first transaction responses may include details associated with the account details of the user 102 or the like.

The first processor 112 may be further configured to generate a transaction signal based on processing of the plurality of second transaction responses. The processing of the plurality of second transaction responses may include verifying the information included in the plurality of second transaction responses, deducting the fare based on the verified information, and the like. The first processor 112 may be further configured to transmit the transaction signal to the user device 104 by way of the UWB anchor 114. The user device 104 may be further configured to detect that the first access control operation is successful based on the reception of the transaction signal. For example, the transaction signal may indicate fare deduction by the service provider (e.g., a metro service provider) associated with the fare collection terminal (e.g., the access control device 106) from the financial account of the user 102. In addition, the transaction signal may include providing a message on the user device 104 indicating the successful deduction of fare. The access control device 106 may further provide access to the user 102 of the user device 104 for accessing public transportation (e.g., entering the metro station) based on the transaction signal. In an example, the access may be provided by opening a gate to access the public transportation. In an event that the access control operation fails, the access control device 106 may re-initiate the access control operation for finite attempts. Examples of the first processor 112 may be a central processing unit (CPU), a graphics processing unit (GPU), a microcontroller, an application-specific integrated circuit (ASIC), or the like.

UWB Anchor 114:

The UWB anchor 114 may include suitable circuitry that may be configured to perform one or more operations. For example, the UWB anchor 114 may be configured to establish communication with various devices such as the user device 104. The UWB anchor 114 may have the first range associated therewith. The UWB anchor 114 may detect various devices (such as the user device 104) within the first range. The UWB anchor 114 may be further configured to transmit the plurality of authentication requests, received from the first processor 112, to the user device 104 when the user device 104 is detected to be within the first range of the UWB anchor 114. The UWB anchor 114 may be further configured to receive the plurality of authentication responses from the user device 104 based on the plurality of authentication requests. The UWB anchor 114 may be further configured to transmit the session identifier, generated by the first processor 112, to the user device 104 based on the successful mutual authentication between the access control device 106 and the user device 104.

The UWB anchor 114 may have the transaction area associated therewith to detect the user device 104. The access control operation may be executed by the access control device 106 for the user device 104 when the user device 104 is detected to be within the transaction area. The UWB anchor 114 may be further configured to receive the first session key, the session identifier, and the plurality of first transaction requests from the first processor 112 when the user device 104 is within the transaction area of the access control device 106.

The UWB anchor 114 may be further configured to encrypt the plurality of first transaction requests to generate the plurality of first transaction payloads by utilizing the first payload key. The plurality of first transaction requests may be encrypted by way of the first payload key that is derived from the first session key and the session identifier. The encryption of the plurality of first transaction requests may be executed using AES (advanced encryption standard), DES (data encryption standard), or the like. The UWB anchor 114 may be further configured to decrypt the plurality of second transaction responses received from the user device 104 that are generated based on the plurality of first transaction payloads. The plurality of second transaction responses may be decrypted by the first payload key. The decryption of the plurality of second transaction responses may be executed using AES (advanced encryption standard), DES (data encryption standard), or the like. Each of the plurality of second transaction responses may include a first value. The UWB anchor 114 may be further configured to determine the distance between the user device 104 and the access control device 106 based on the first value. The UWB anchor 114 may thus determine that the user device 104 is within the transaction area based on the first value. The access control device may execute the access control operation when the user device 104 is within the transaction area based on the first value. An example of the UWB anchor 114 may be a UWB transceiver.

User Device 104:

The user device 104 may be a UWB communication device. The user 102 may utilize the user device 104 to communicate with the access control device 106. Examples of the user device 104 may include a mobile device, a smartphone, a smartwatch, a tablet, a phablet, a smart key, a smart card, or the like. The user device 104 may include a host processor 120, a second secure element 122, and a UWB system 124. The host processor 120, the second secure element 122, and the UWB system 124 may communicate with each other by way of a third communication channel 126. Examples of the third communication channel 126 include a serial peripheral interface (SPI), an inter-integrated channel (12C), or the like.

Host Processor 120:

The host processor 120 may be a main processor of the user device 104. The host processor 120 may include suitable circuitry that may be configured to perform one or more operations. For example, the host processor 120 may be configured to facilitate the installation of various applications (such as a transit application, a payment application, or the like). The host processor 120 may be configured to receive the setup message generated by the access control device 106 when the user device 104 is within the first range of the access control device 106. Based on the setup message, the host processor 120 may be further configured to generate a set of setup signals and provide the set of setup signals to the UWB system 124. The set of setup signals may be a wakeup signal such that based on the reception of the set of setup signals, the UWB system 124 may be configured to perform a transition of the UWB system 124 from the low power mode to the normal mode. The transition to the normal mode enables the UWB communication (e.g., initiates the access control operation) between the user device 104 and the access control device 106. Examples of the host processor 120 may be a central processing unit (CPU), a graphics processing unit (GPU), a microcontroller, an application-specific integrated circuit (ASIC), or the like.

Second Secure Element 122:

The second secure element 122 may include suitable circuitry that is configured to store second cryptographic data pertaining to the user device 104. Further, the plurality of first transaction responses and the plurality of authentication responses may be generated based on the second cryptographic data. The second secure element 122 may be further configured to receive the plurality of authentication requests from the access control device 106 by way of the UWB system 124. The second secure element 122 may be configured to authenticate the access control device 106 based on the plurality of authentication requests. The second secure element 122 may be further configured to generate the plurality of authentication responses based on the plurality of authentication requests. The plurality of authentication responses may refer to the data generated by the user device 104 based on successful authentication of the access control device 106 and the plurality of authentication requests.

The second secure element 122 may be further configured to generate a second session key based on successful authentication of the access control device 106. In an embodiment, the second session key may be a second master key. The second master key is a cryptographic key that may be utilized to derive or generate other cryptographic keys such as a second payload key. The second payload key may be utilized in various operations such as encryption and decryption of various messages such as the plurality of first transaction payloads, the plurality of first transaction responses, or the like. The second session key may be generated to facilitate the execution of the access control operation.

In an embodiment, the first session key and the second session key may be identical such that an encryption of the plurality of first transaction requests by the access control device 106 based on the first payload key may be identical to the encryption of the plurality of first transaction responses by the UWB system 124 based on the second payload key. The second secure element 122 may be further configured to receive a query signal from the UWB system 124. The second secure element 122 may receive the query signal to confirm a presence of the second session key in the second secure element 122. Based on the query signal, the second secure element 122 may be further configured to generate a confirmation signal indicative of the presence of the second session key in the second secure element 122. The confirmation signal is generated based on the query signal. The mutual authentication of the access control device 106 and the user device 104 is detected to be successful based on the confirmation signal.

The second secure element 122 may be further configured to receive the session identifier from the access control device 106 by way of the UWB system 124 based on the successful mutual authentication between the user device 104 and the access control device 106. The second secure element 122 may be further configured to generate a ranging payload set based on the reception of the session identifier from the UWB system 124. The UWB system 124 may be configured to secure the communication between the access control device 106 and the user device 104 based on the ranging payload set. In an embodiment, the ranging payload set may include the second session key and the session identifier. The second secure element 122 may be further configured to provide the ranging payload set to the UWB system 124 based on the reception of the plurality of first transaction payloads by the UWB system 124. The second secure element 122 is further configured to erase the ranging payload set from a memory (not shown) associated with the second secure element 122 upon providing the ranging payload set to the UWB system 124.

The second secure element 122 may be further configured to receive the plurality of second transaction payloads from the UWB system 124 based on the plurality of first transaction payloads. The plurality of first transaction payloads may be a set of requests to facilitate the access control operation. The plurality of first transaction requests may be indicative of information requested by the access control device 106 from the user device 104. The plurality of second transaction payloads may be decrypted versions of the plurality of first transaction payloads. The second secure element 122 may be further configured to generate the plurality of first transaction responses based on the plurality of second transaction payloads. The second secure element 122 may be configured to provide the plurality of first transaction responses to the UWB system 124. The second secure element 122 may be further configured to receive the transaction signal from the access control device 106 by way of the UWB system 124. The access control device 106 may generate the transaction signal based on the processing of the plurality of second transaction responses. The second secure element 122 may be configured to detect that the access control operation is successful based on the reception of the transaction signal.

UWB System 124:

The UWB system 124 may be configured to enable the UWB communication with the access control device 106. The UWB system 124 may include a UWB processor 128, a memory 130, and a communication circuit 132. The UWB processor 128, the memory 130, and the communication circuit 132 interact with each other by way of a fourth communication channel 134. Examples of the fourth communication channel 134 may include a serial peripheral interface (SPI), an inter-integrated channel (12C), or the like.

UWB Processor 128:

The UWB processor 128 may include suitable circuitry that may be configured to perform one or more operations. For example, the UWB processor 128 may be further configured to receive the set of setup signals from the host processor 120 of the user device 104. The UWB processor 128 may be further configured to perform a transition of the UWB system 124 from the low power mode to the normal mode based on the reception of the set of setup signals from the host processor 120. On the transition to the normal mode, the mutual authentication between the user device 104 and the access control device 106 may be initiated. The UWB processor 128 may be further configured to receive the plurality of authentication requests from the access control device 106 when the user device 104 is detected to be within the first range of the access control device 106.

The UWB processor 128 may be further configured to provide the plurality of authentication requests to the second secure element 122. The second secure element 122 may generate the plurality of authentication responses based on the plurality of authentication requests. The second secure element 122 may authenticate the access control device 106 based on the plurality of authentication requests.

The UWB processor 128 may be further configured to receive the plurality of authentication responses from the second secure element 122. The second secure element 122 may generate the plurality of authentication responses based on the plurality of authentication requests. The plurality of authentication responses may refer to the data generated by the user device 104 based on the successful authentication of the access control device 106. The UWB processor 128 may be further configured to transmit the plurality of authentication responses to the access control device 106. The access control device 106 may authenticate the user device 104 based on the plurality of authentication responses. The UWB processor 128 may be further configured to receive the status signal from the access control device 106. The first processor 112 may generate the status signal based on the processing of the plurality of authentication responses. The UWB processor 128 may be further configured to generate the query signal based on the status signal. The UWB processor 128 may be configured to provide the query signal to the second secure element 122 to confirm a presence of the second session key in the second secure element 122. The UWB processor 128 may be further configured to receive the confirmation signal from the second secure element 122. Based on the confirmation signal, the UWB processor 128 may be configured to detect that the mutual authentication between the user device 104 and the access control device 106 is successful. Based on the successful mutual authentication between the access control device 106 and the user device 104, the UWB processor 128 may be further configured to receive the session identifier associated with the first session key from the access control device 106.

The UWB processor 128 may be further configured to provide the session identifier associated with the first session key to the second secure element 122 based on the reception of the session identifier associated with the first session key from the access control device 106. The access control device 106 may generate the first session key and the second secure element 122 may generate the second session key to indicate successful mutual authentication between the user device 104 and the access control device 106. The UWB processor 128 may be further configured to schedule a secure data exchange session between the user device 104 and the access control device 106. The secure data exchange session may refer to an encrypted communication interaction between two or more entities (e.g., the access control device 106 and the user device 104) to ensure confidentiality and authenticity of data transmitted between the two or more entities. The secure data exchange session may be scheduled based on the first session key and the second session key.

The UWB processor 128 may be further configured to receive, during the secure data exchange session, the plurality of first transaction payloads from the access control device 106. Each of the plurality of first transaction payloads may include the session identifier. The UWB processor 128 may receive the plurality of first transaction payloads when the user device 104 is within the transaction area of the access control device 106. The UWB processor 128 may be further configured to request the ranging payload set from the second secure element 122 based on the reception of the plurality of first transaction payloads. The UWB processor 128 may be further configured to store the ranging payload set received from the second secure element 122, in the memory 130 of the UWB system 124. The UWB processor 128 may be further configured to generate the second payload key based on the ranging payload set received from the second secure element 122. The second payload key may be generated based on the second session key of the ranging payload set and the session identifier of the plurality of first transaction payloads. The second payload key may be generated utilizing a cryptographic algorithm whose inputs are the second session key and the session identifier of the plurality of first transaction payloads.

The UWB processor 128 may be further configured to decrypt the plurality of first transaction payloads to generate the plurality of second transaction payloads based on the second payload key. The access control operation may be executed by the access control device 106 for the user device 104 based on the plurality of second transaction payloads. In one or more embodiments, the UWB processor 128 may combine the plurality of first transaction payloads and the second payload key. Further, the UWB processor 128 may implement a decryption algorithm on the combination of the plurality of first transaction payloads and the second payload key. The decryption algorithm may include one or more mathematical operations such as substitution, permutation, and bitwise operations on the plurality of first transaction payloads to generate the plurality of second transaction payloads. The decryption algorithm may be based on the type of encryption standard that is followed to encrypt the plurality of first transaction payloads. Examples of encryption standards may include AES (advanced encryption standard), DES (data encryption standard), or the like.

The UWB processor 128 may be further configured to provide the plurality of second transaction payloads to the second secure element 122 based on the successful decryption of the plurality of first transaction payloads. The UWB processor 128 may be further configured to receive the plurality of first transaction responses from the second secure element 122 based on the plurality of second transaction payloads. The UWB processor 128 may be further configured to encrypt, based on the second payload key, each of the plurality of first transaction responses to generate the plurality of second transaction responses.

The UWB processor 128 may be further configured to transmit the plurality of second transaction responses to the access control device 106. The UWB processor 128 may be further configured to receive the transaction signal from the access control device 106. The transaction signal may be generated by the access control device 106 based on the processing of the plurality of second transaction responses (e.g., the plurality of second transaction responses are decrypted). The UWB processor 128 may be configured to provide the transaction signal. Based on the transaction signal, the second secure element 122 may detect that the access control operation is successful. The UWB processor 128 may be further configured to erase the second session key from the memory 130 associated with the UWB system 124 based on the reception of the transaction signal from the access control device 106.

Communication Circuit 132:

The communication circuit 132 of the UWB system 124 may be configured to transmit and receive messages between the UWB anchor 114 and the UWB processor 128. Examples of the messages may include the plurality of authentication responses, the plurality of authentication requests, or the like. Examples of the communication circuit 132 may include a transmitter, a receiver, a transceiver, an antenna, or the like.

Memory 130:

The memory 130 may be configured to store the ranging payload set received by the UWB processor 128. The memory 130 may be configured to erase the second session key of the ranging payload set based on the reception of the transaction signal from the access control device 106. Examples of the memory 130 may include a flash memory, solid-state drives (SSD), a non-volatile random-access memory (NVRAM), a magnetoresistive random-access memory (MRAM), a phase change memory (PCM), a battery-backed static random-access memory (SRAM), a resistive random-access memory (ReRAM), or the like.

In Operation:

In an exemplary scenario, the UWB environment 100 is a metro transit scenario. In such a scenario, the user 102 approaches a fare collection terminal at a metro station. The fare collection terminal may be the access control device 106. Further, the access control operation may be an entry to a metro platform at the metro station. The first processor 112 may generate the setup message to enable communication with the user device 104 when the user device 104 is detected to be within the first range (e.g., 50 m²) of the access control device 106. The access control device 106 may transmit the setup message to the user device 104. The host processor 120 may generate the set of setup signals based on the setup message. The UWB system 124 may receive the set of setup signals from the host processor 120. The UWB system 124 may perform the transition of the UWB system 124 from the low power mode to the normal mode based on the reception of the set of setup signals. Based on the reception of the set of setup signals, the UWB communication between the access control device 106 and the user device 104 is established. The mutual authentication between the user device 104 and the access control device 106 is initiated based on the transitioning of the UWB system 124 to the normal mode.

The first processor 112 may generate the plurality of authentication requests when the user device 104 is detected to be within the first range of the access control device 106 to initiate the mutual authentication between the user device 104 and the access control device 106. The plurality of authentication requests may be a set of requests to confirm an identity of the access control device 106. The UWB anchor 114 may transmit the plurality of authentication requests to the UWB system 124. The UWB system 124 may provide the plurality of authentication requests to the second secure element 122. The second secure element 122 may authenticate the access control device 106 based on the plurality of authentication requests. The second secure element 122 may generate the plurality of authentication responses based on the plurality of authentication requests. The plurality of authentication responses may include a set of responses to confirm an identity of the user device 104. The second secure element 122 may generate the second session key based on successful authentication of the access control device 106. The second secure element 122 may provide the plurality of authentication responses to the UWB system 124.

The UWB system 124 may transmit the plurality of authentication responses to the first processor 112 by way of the UWB anchor 114. The first processor 112 may authenticate the user device 104 based on the plurality of authentication responses. The first processor 112 may generate the first session key based on successful authentication of the user device 104. The first processor 112 may generate the status signal based on the processing of the plurality of authentication responses. The UWB anchor 114 may transmit the status signal to the UWB system 124. The UWB system 124 may generate the query signal based on the status signal. The UWB system 124 may provide the query signal to the second secure element 122. The second secure element 122 may generate the confirmation signal based on the query signal to confirm the presence of the second session key in the second secure element 122. The UWB system 124 may detect successful mutual authentication between the access control device 106 and the user device 104 based on the confirmation signal. The first processor 112 may generate the session identifier based on the successful mutual authentication. The access control device 106 may identify the user device 104 based on the session identifier. The first processor 112 may transmit the session identifier to the UWB system 124 by way of the UWB anchor 114. The UWB system 124 may provide the session identifier to the second secure element 122.

The second secure element 122 may store the session identifier in the memory associated with the second secure element 122. The second secure element 122 may generate the ranging payload set such that the ranging payload set may include the session identifier and the second session key based on the reception of the session identifier. The first processor 112 may generate the plurality of first transaction requests based on the detection of the user device 104 in the transaction area of the access control device 106 and based on the transmission of the session identifier. The plurality of first transaction requests may be a set of requests to initiate the access control operation between the access control device 106 and the user device 104. The plurality of first transaction requests may be indicative to retrieve account details of the user 102 for deducting the fare of the transaction, or the like. The UWB anchor 114 may encrypt the plurality of first transaction requests to generate the plurality of first transaction payloads by utilizing the first payload key. The UWB anchor 114 may transmit the plurality of first transaction payloads to the UWB system 124 when the user device 104 is within the transaction area (e.g., 1.5 m²) of the access control device 106. The UWB system 124 may request the ranging payload set from the second secure element 122 based on the reception of the plurality of first transaction payloads. The second secure element 122 may provide the ranging payload set to the UWB system 124.

The UWB system 124 may generate the second payload key from the second session key of the ranging payload set and the session identifier received from the plurality of first transaction payloads. The UWB system 124 may decrypt the plurality of first transaction payloads to generate the plurality of second transaction payloads by utilizing the second payload key. The UWB system 124 may provide the plurality of second transaction payloads to the second secure element 122. The second secure element 122 may generate the plurality of first transaction responses based on the processing of the plurality of second transaction payloads and provide the plurality of first transaction responses to the UWB system 124. The plurality of first transaction responses may include the financial account details of the user 102, or the like. The UWB system 124 may encrypt the plurality of first transaction responses to generate the plurality of second transaction responses based on the second payload key. The UWB system 124 may transmit the plurality of second transaction responses to the UWB anchor 114.

The UWB anchor 114 may decrypt the plurality of second transaction responses by utilizing the first payload key. The UWB anchor 114 may provide the plurality of second transaction responses to the first processor 112. The first processor 112 may generate the transaction signal based on the processing of the plurality of second transaction responses. The first processor 112 may transmit the transaction signal to the UWB system 124 by way of the UWB anchor 114. The transaction signal may indicate that the fare has been received by the service provider of the fare collection terminal (e.g., the access control device 106) from the financial account of the user 102 by way of the user device 104. Based on the reception of the fare, the fare collection terminal (e.g., the access control device 106) thereby provides access to public transportation (access control operation) to the user 102 of the user device 104. The UWB system 124 may provide the transaction signal to the second secure element 122. The second secure element 122 may detect that the access control operation is successful based on the reception of the transaction signal. The UWB system 124 may erase the second session key from the memory 130 based on the reception of the transaction signal.

Figure 2:
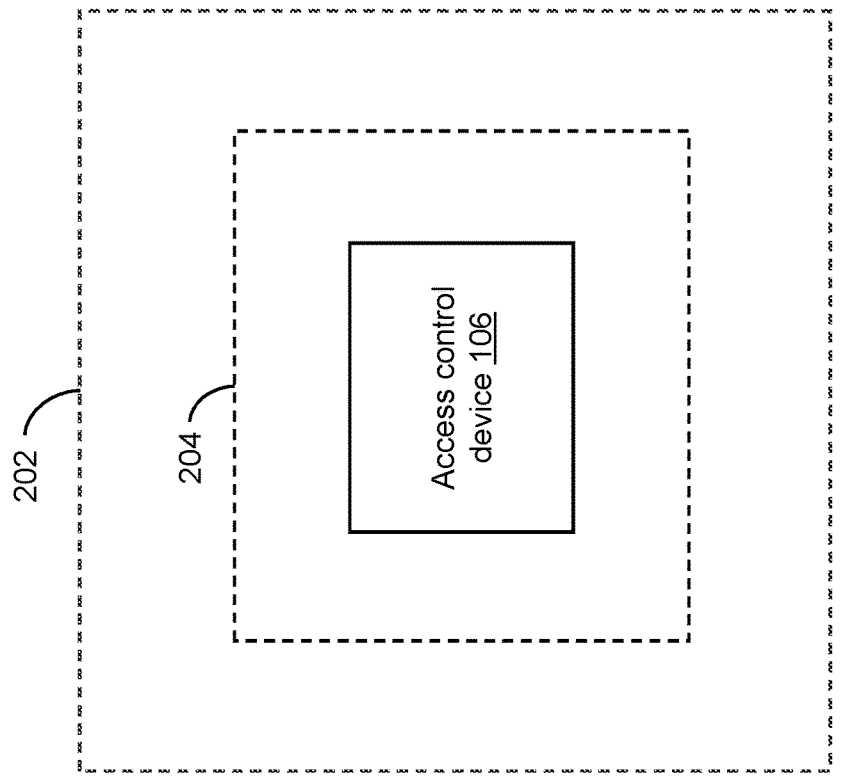
FIG. 2 illustrates a schematic diagram of operating ranges of an access control device of the UWB environment of FIG. 1, in accordance with an embodiment of the present disclosure.

FIG. 2 illustrates a schematic diagram 200 of operating ranges of the access control device 106, in accordance with an embodiment of the present disclosure. The operating ranges may include a first area 202 and a second area 204. The first area 202 may refer to the first range of the access control device 106 such that the plurality of authentication requests may be transmitted to the user device 104 when the user device 104 is within the first range. Further, the second area 204 may represent the transaction area of the access control device 106. The plurality of first transaction payloads may be transmitted by the access control device 106 when the user device 104 is within the transaction area. In other embodiments, the transaction area may be the same as the first range.

FIGS. 3A-3E represent a process flow diagram 300 that illustrates the access control of the user device 104, in accordance with an embodiment of the present disclosure.

Figure 3A:
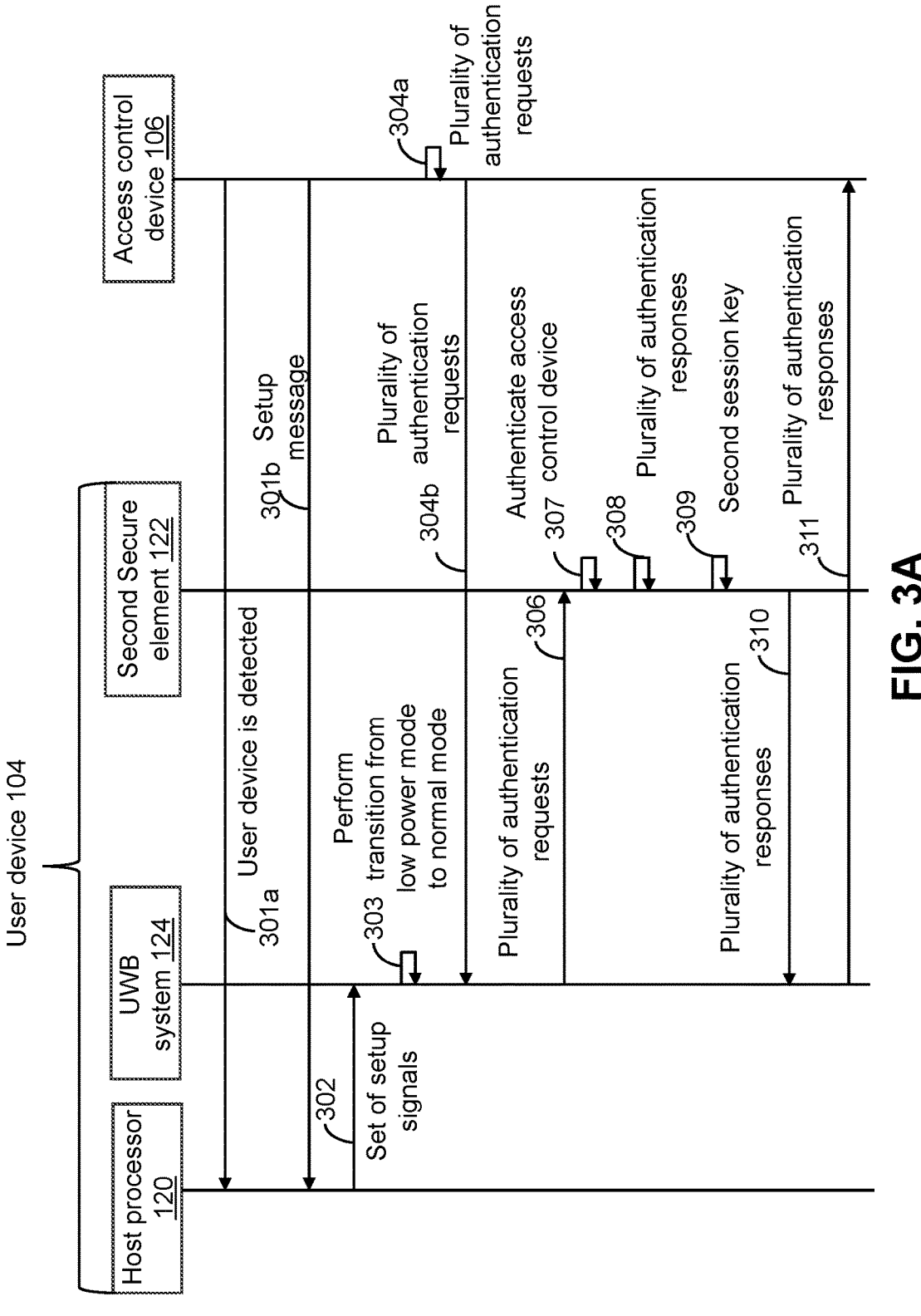
FIGS. 3A-3E represent a process flow diagram that illustrates access control of a user device of the UWB environment of FIG. 1, in accordance with an embodiment of the present disclosure.

Referring to FIG. 3A, the access control device 106 may detect the user device 104 when the user device 104 is within the first range of the access control device 106 (as shown by arrow 301a) and transmit the setup message to the user device 104 (as shown by arrow 301b). The setup message may include the UWB frequency range such that the access control device 106 may communicate within the UWB frequency range. The host processor 120 may provide the set of setup signals (e.g., the wakeup signal) to the UWB system 124 based on the reception of the setup message (as shown by arrow 302). The UWB system 124 may perform the transition from the low power mode to the normal mode based on the reception of the set of setup signals (as shown by arrow 303). Based on the detection of the user device 104 in the first range and based on the transmission of the setup message, the access control device 106 may generate the plurality of authentication requests (as shown by arrow 304a). The UWB system 124 may receive the plurality of authentication requests from the access control device 106 (as shown by arrow 304b). The plurality of authentication requests may include the first cryptographic data pertaining to the authentication of the access control device 106. The UWB system 124 may provide the plurality of authentication requests to the second secure element 122 (as shown by arrow 306). The second secure element 122 may authenticate the access control device 106 based on the plurality of authentication requests (as shown by arrow 307). The plurality of authentication responses may be generated by the second secure element 122 based on the plurality of authentication requests (as shown by arrow 308). The second secure element 122 may generate the second session key based on the successful authentication of the access control device 106 (as shown by arrow 309). The plurality of authentication responses may include the second cryptographic data pertaining to the authentication of the user device 104 based on the set of queries included in the plurality of authentication requests. The plurality of authentication responses may be provided to the UWB system 124 by the second secure element 122 (as shown by arrow 310).

The access control device 106 may receive the plurality of authentication responses from the UWB system 124 (as shown by arrow 311).

Figure 3B:
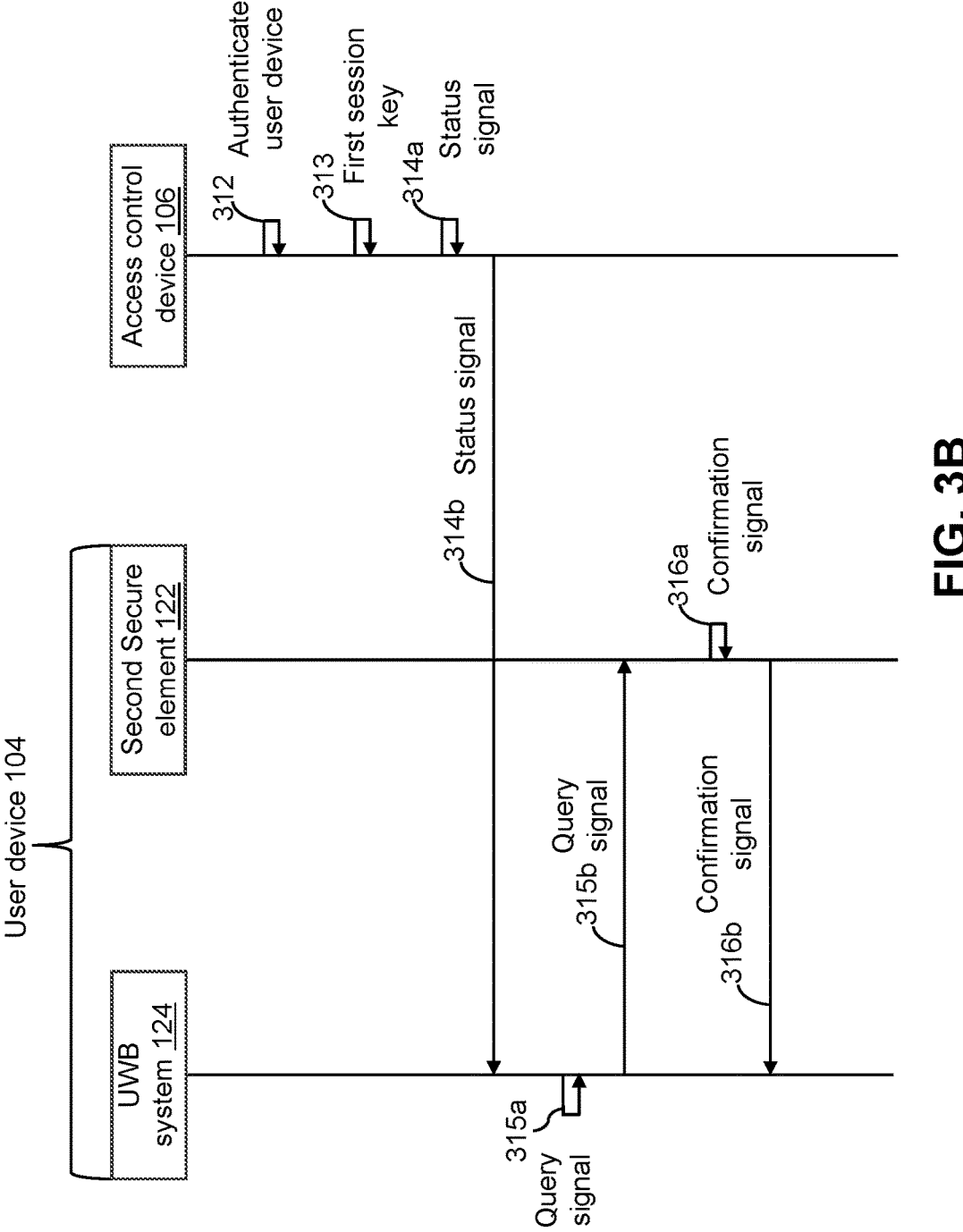

Referring to FIG. 3B, the access control device 106 may authenticate the user device 104 based on the plurality of authentication responses (as shown by arrow 312). The access control device 106 may generate the first session key based on successful authentication of the user device 104 (as shown by arrow 313). The access control device 106 may generate the status signal based on the processing of the plurality of authentication responses (as shown by arrow 314a). The access control device 106 may transmit the status signal to the UWB system 124 based on the processing of the plurality of authentication responses (as shown by arrow 314b). The UWB system 124 may generate the query signal based on the status signal (as shown by arrow 315a). The UWB system 124 may provide the query signal to the second secure element (as shown by arrow 315b). The second secure element 122 may generate the confirmation signal based on the query signal (as shown by arrow 316a). The second secure element 122 may generate the confirmation signal to confirm the presence of the second session key in the second secure element 122. The second secure element may provide the confirmation signal to the UWB system 124 (as shown by arrow 316b).

Figure 3C:
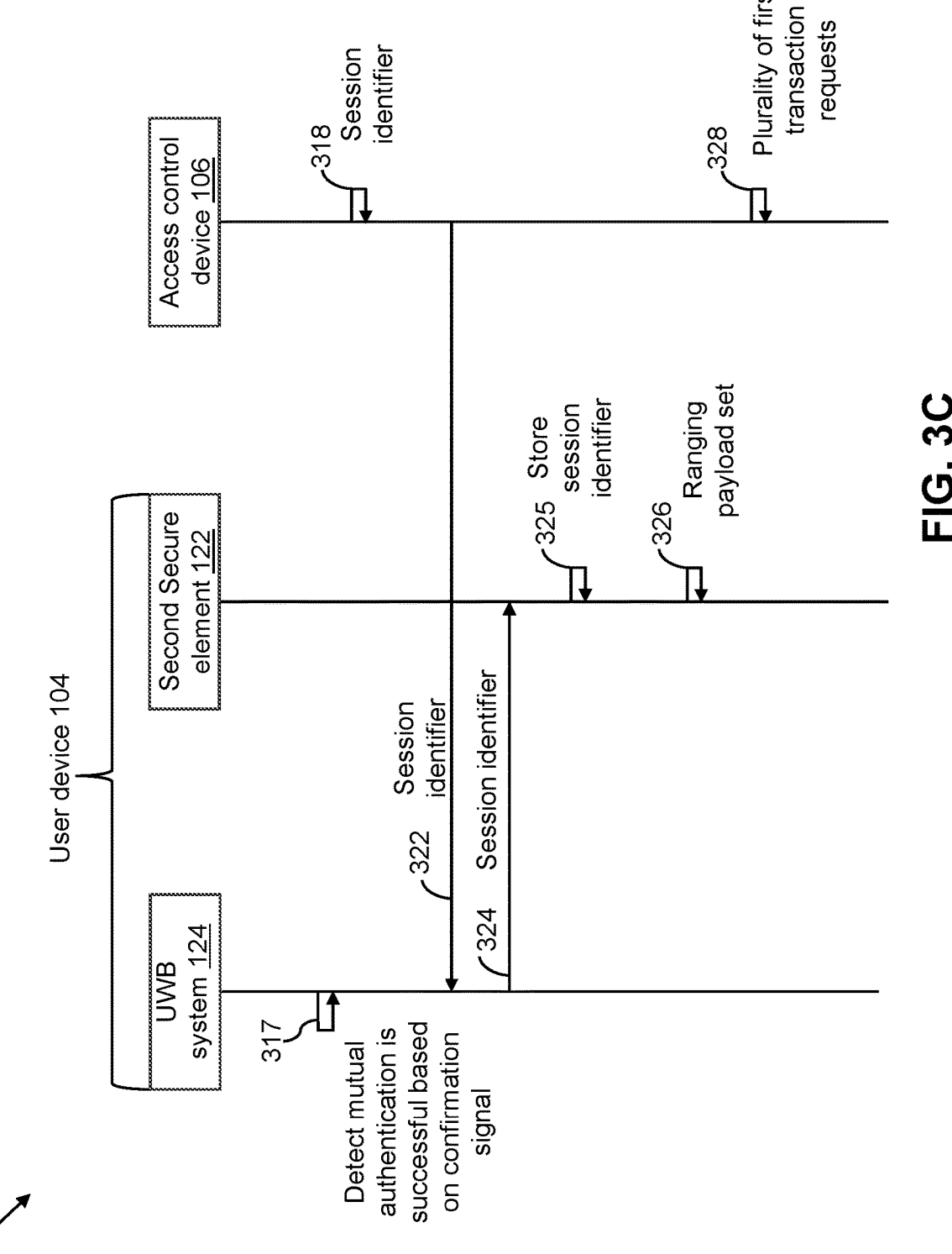

Referring to FIG. 3C, the UWB system 124 may detect that the mutual authentication between the access control device 106 and the user device 104 is successful based on the confirmation signal (as shown by arrow 317). For the sake of simplicity of the ongoing description, it is assumed that the mutual authentication between the user device 104 and the access control device 106 is successful. The session identifier may be generated by the access control device 106 based on the successful mutual authentication of the user device 104 and the access control device 106 (as shown by arrow 318). The session identifier may be utilized by the access control device 106 to identify the ongoing session with the user device 104. The access control device 106 may transmit the session identifier to the UWB system 124 based on the successful mutual authentication (as shown by arrow 322). The UWB system 124 may provide the session identifier to the second secure element 122 (as shown by arrow 324). Further, the second secure element 122 may store the session identifier (as shown by arrow 325). The second secure element 122 may generate the ranging payload set based on the reception of the session identifier (as shown by arrow 326). The ranging payload set may include the second session key and the session identifier. The access control device 106 may generate the plurality of first transaction requests when the user device 104 is detected to be within the transaction area and based on the transmission of the session identifier (as shown by arrow 328). The plurality of first transaction requests may be a set of requests to initiate the access control operation between the access control device 106 and the user device 104.

Figure 3D:
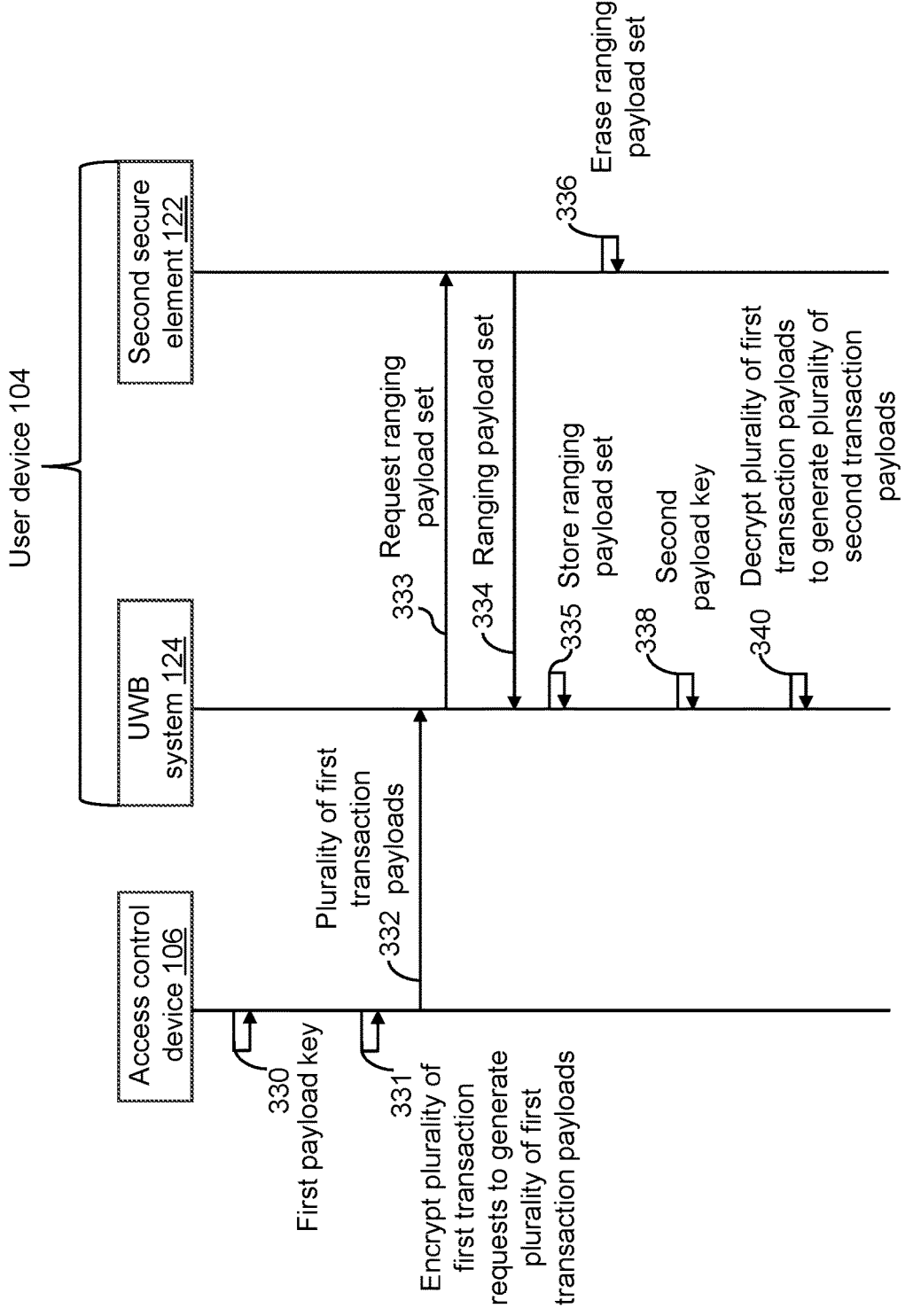

Referring to FIG. 3D, the access control device 106 may generate the first payload key based on the first session key and the session identifier (as shown by arrow 330). The access control device 106 may encrypt the plurality of first transaction requests to generate the plurality of first transaction payloads by utilizing the first payload key (as shown by arrow 331). The UWB system 124 may receive the plurality of first transaction payloads from the access control device 106 during the secure data exchange session (as shown by arrow 332). The UWB system 124 may request the ranging payload set from the second secure element 122 (as shown by arrow 333) based on the reception of the plurality of first transaction payloads. The second secure element 122 may provide the ranging payload set to the UWB system 124 (as shown by arrow 334). The UWB system 124 may receive and store the ranging payload set from the second secure element 122 in the memory 130 associated with the UWB system 124 (as shown by arrow 335). Further, upon providing the ranging payload set to the UWB system 124, the second secure element 122 may erase the ranging payload set (e.g., the session identifier) from the memory associated with the second secure element 122 (as shown by arrow 336). The UWB system 124 may generate the second payload key based on the ranging payload set and the session identifier of the plurality of first transaction payloads (as shown by arrow 338). The UWB system 124 may decrypt the plurality of first transaction payloads to generate the plurality of second transaction payloads by utilizing the second payload key (as shown by arrow 340).

Figure 3E:
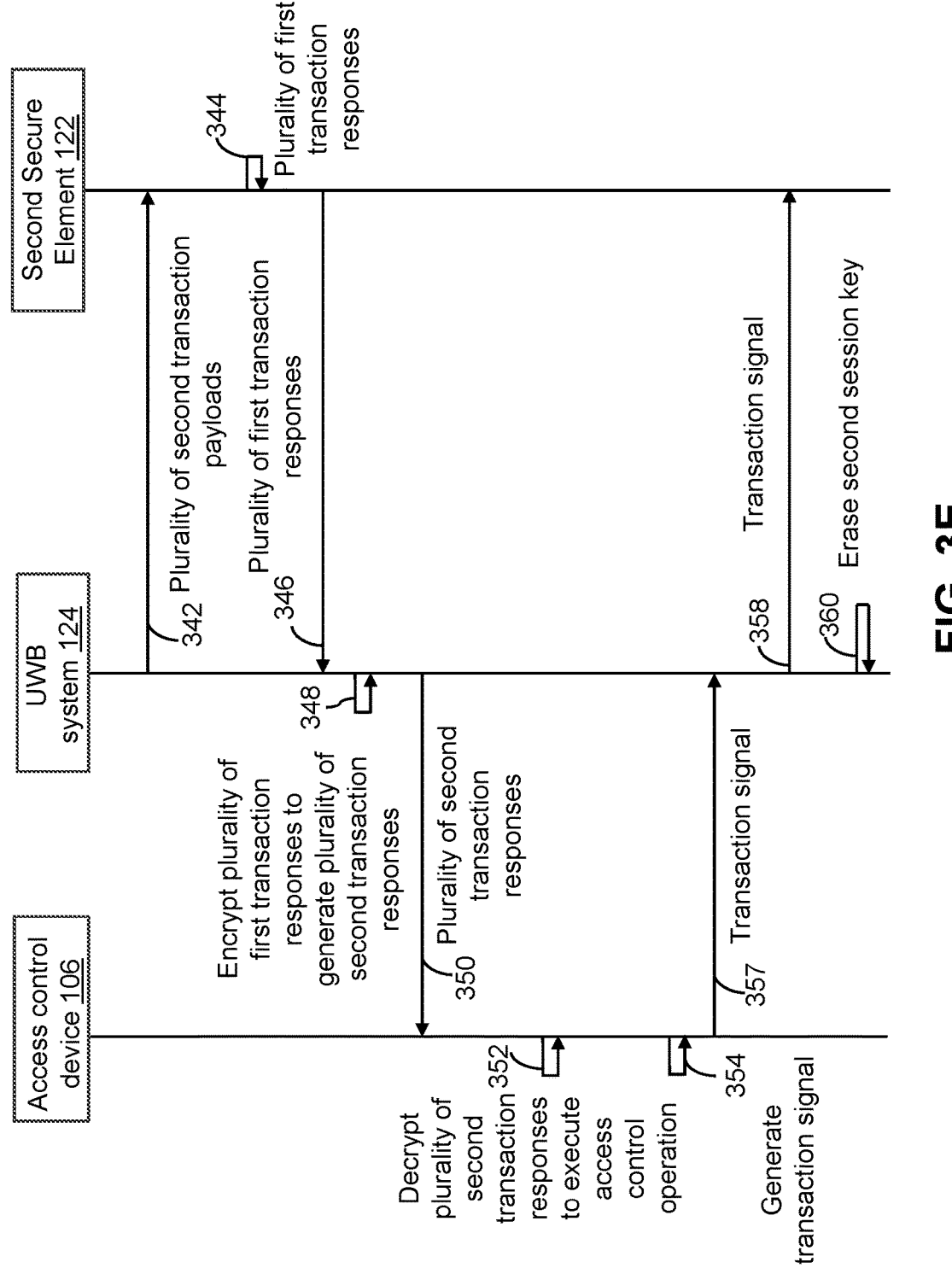

Referring to FIG. 3E, the UWB system 124 may provide the plurality of second transaction payloads to the second secure element 122 (as shown by arrow 342). The plurality of first transaction responses may be generated by the second secure element 122 based on the plurality of second transaction payloads (as shown by arrow 344). The plurality of first transaction responses may include details associated with the information requested in the plurality of first transaction payloads. The second secure element 122 may provide the plurality of first transaction responses to the UWB system 124 (as shown by arrow 346). The UWB system 124 may encrypt the plurality of first transaction responses to generate the plurality of second transaction responses by utilizing the second payload key (as shown by arrow 348). The UWB system 124 may transmit the plurality of second transaction responses to the access control device 106 (as shown by arrow 350). The access control device 106 may decrypt the plurality of second transaction responses based on the first payload key to execute the access control operation (as shown by arrow 352). The access control device 106 may generate the transaction signal based on the processing of the plurality of second transaction responses (as shown by arrow 354). The access control device 106 may transmit the transaction signal to the UWB system 124 (as shown by the arrow 357). The UWB system 124 may further provide the transaction signal to the second secure element 122 (as shown by arrow 358). Based on the reception of the transaction signal, the second secure element 122 may detect that the access control operation is successful. Based on the reception of the transaction signal, the UWB system 124 may erase the second session key (as shown by arrow 360).

FIGS. 4A-4F represent a flowchart 400 that illustrates a UWB communication method executed by the user device 104 and the access control device 106, in accordance with an embodiment of the present disclosure. The flowchart 400 describes the operation performed by the UWB system 124.

Referring to FIG. 4A, at step 402, the UWB processor 128 may receive the set of setup signals from the host processor 120 when the user device 104 is within the first range of the access control device 106. At step 404, the UWB processor 128 may perform the transition of the UWB system 124 from the low power mode to the normal mode based on the reception of the set of setup signals. At step 406, the UWB processor 128 may receive the plurality of authentication requests from the access control device 106 based on the transitioning of the UWB system 124 to the normal mode. At step 408, the UWB processor 128 may provide the plurality of authentication requests to the second secure element 122. The second secure element 122 may authenticate the access control device 106 based on the plurality of authentication requests.

Figure 4B:
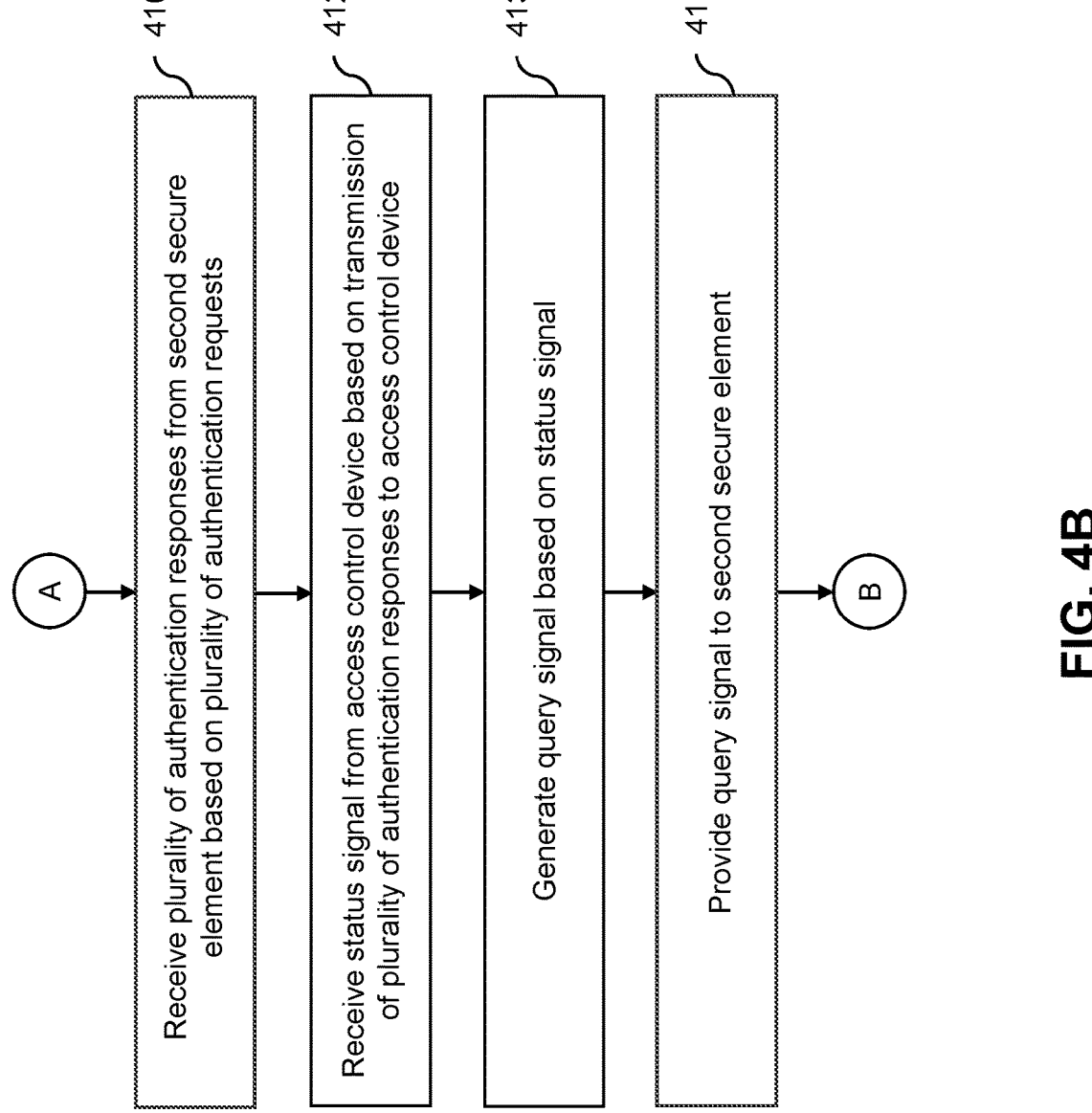

Referring to FIG. 4B, at step 410, the UWB processor 128 may receive the plurality of authentication responses from the second secure element 122 based on the plurality of authentication requests. The access control device 106 may authenticate the user device 104 based on the plurality of authentication responses. At step 412, the UWB processor 128 may receive the status signal from the access control device 106, based on the transmission of the plurality of authentication responses to the access control device 106. At step 413, the UWB processor 128 may generate the query signal based on the status signal. At step 415, the UWB processor 128 may provide the query signal to the second secure element 122 to confirm a presence of the second session key in the secure element 122.

Referring to FIG. 4C, at step 416, the UWB processor 128 may receive the confirmation signal from the second secure element 122 based on the query signal. At step 417, the UWB processor 128 may detect that the mutual authentication is successful based on the confirmation signal. At step 418, the UWB processor 128 may receive the session identifier associated with the first session key from the access control device 106 based on the successful mutual authentication between the user device 104 and the access control device 106. At step 420, the UWB processor 128 may provide the session identifier in the memory associated with the second secure element 122 based on the reception of the session identifier.

Figure 4D:
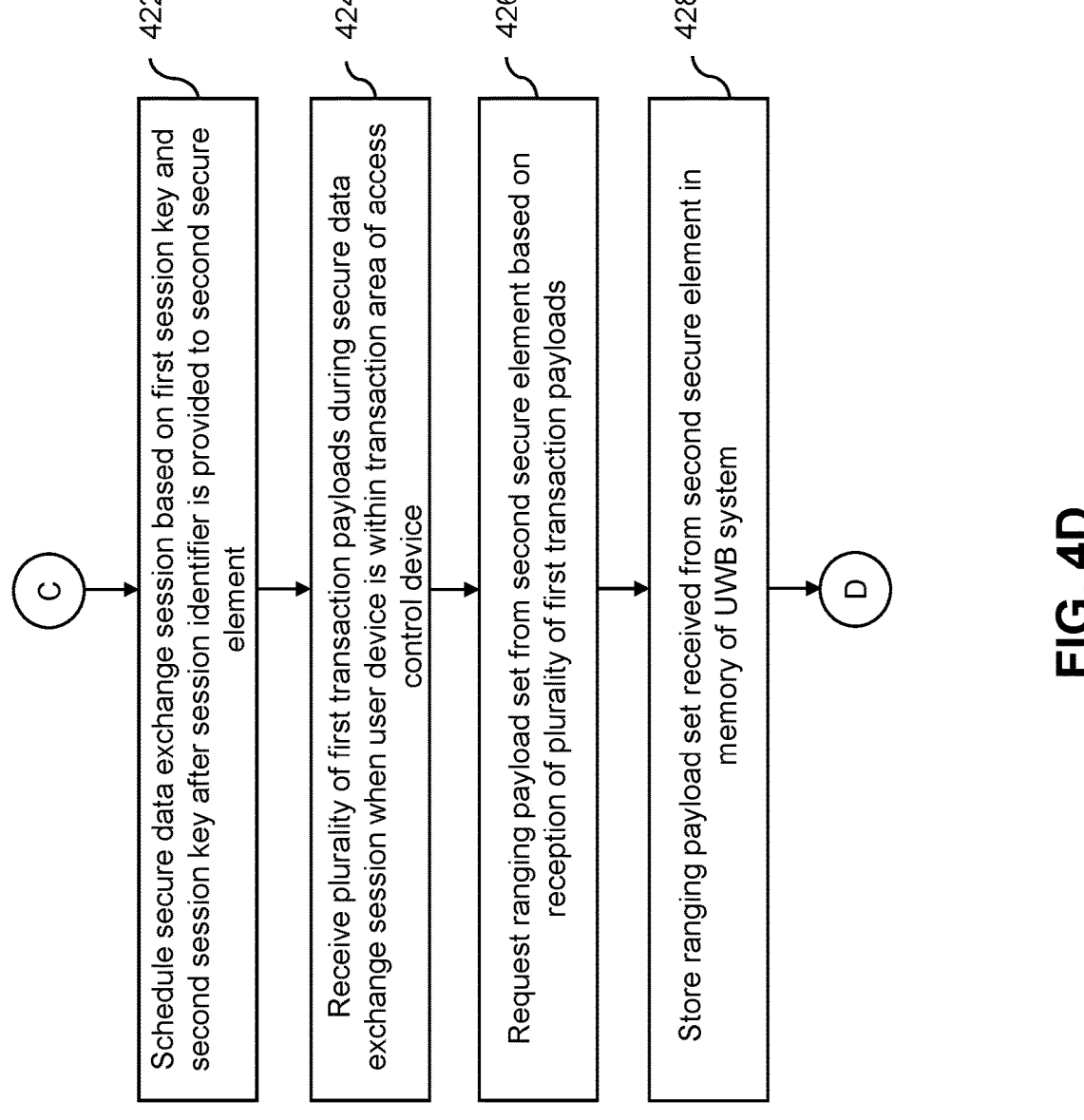

Referring to FIG. 4D, at step 422, the UWB processor 128 may schedule the secure data exchange session based on the first session key and the second session key after the session identifier is provided to the second secure element 122. At step 424, the UWB processor 128 may receive the plurality of first transaction payloads during the secure data exchange session when the user device 104 is within the transaction area of the access control device 106. At step 426, the UWB processor 128 may request the ranging payload set from the second secure element 122 based on the reception of the plurality of first transaction payloads. At step 428, the UWB processor 128 may store the ranging payload set received from the second secure element 122 in the memory 130 of the UWB system 124.

Figure 4E:
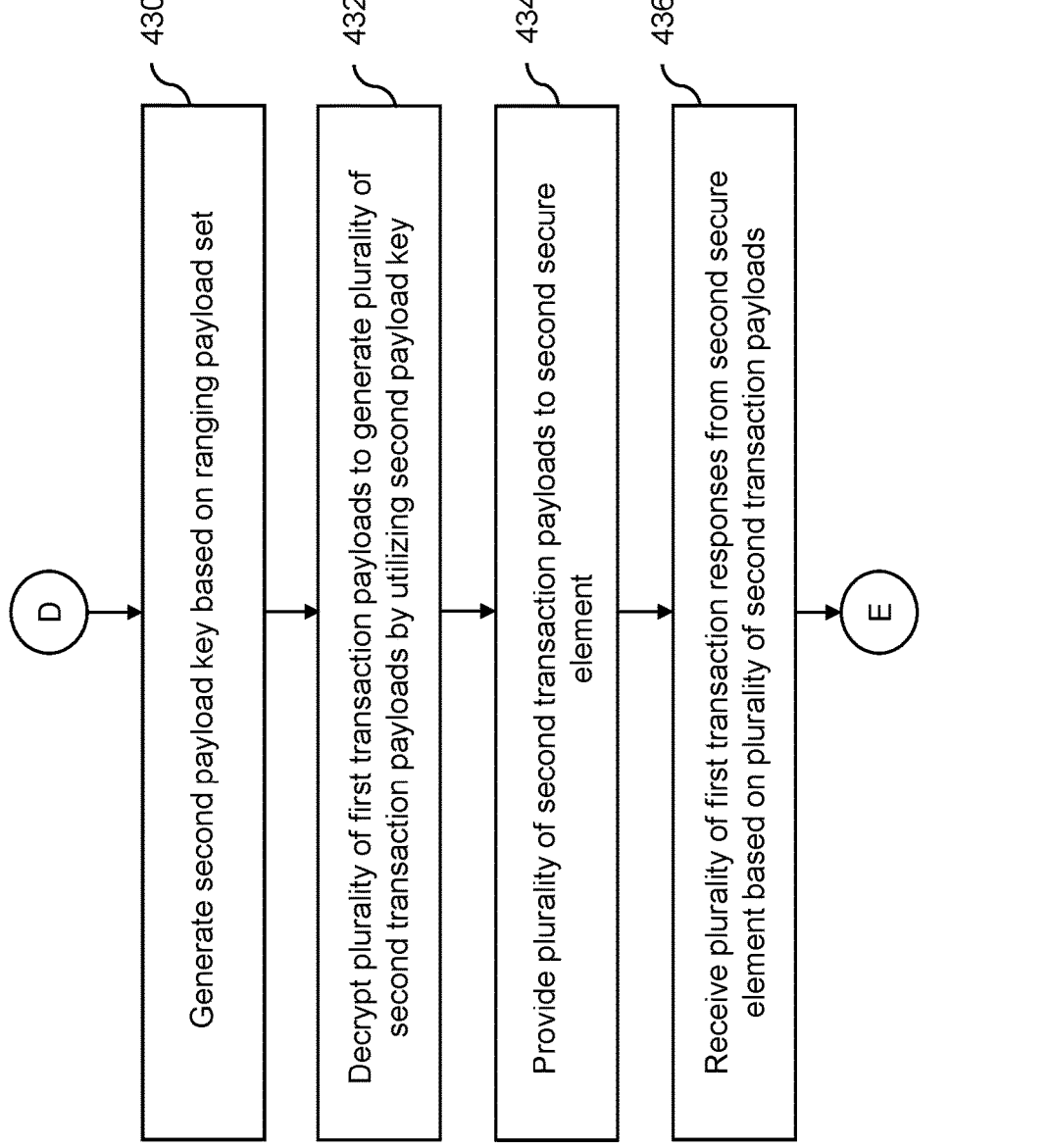

Referring to FIG. 4E, at step 430, the UWB processor 128 may generate the second payload key based on the ranging payload set and the session identifier of the plurality of first transaction payloads. At step 432, the UWB processor 128 may decrypt the plurality of first transaction payloads to generate the plurality of second transaction payloads by utilizing the second payload key. At step 434, the UWB processor 128 may provide the plurality of second transaction payloads to the second secure element 122. At step 436, the UWB processor 128 may receive the plurality of first transaction responses from the second secure element 122 upon providing the plurality of second transaction payloads (based on the plurality of second transaction payloads).

Referring to FIG. 4F, at step 438, the UWB processor 128 may encrypt the plurality of first transaction responses to generate the plurality of second transaction responses by utilizing the second payload key. At step 440, the UWB processor 128 may receive the transaction signal from the access control device 106 based on the processing of the plurality of second transaction responses. At step 442, the UWB processor 128 may provide the transaction signal to the second secure element 122. The second secure element 122 may detect based on the reception of the transaction signal that the access control operation is successful. At step 444, the UWB processor 128 may erase the second session key based on the reception of the transaction signal.

Thus, in the UWB communication technique of the present disclosure, the access control device 106 may transmit the plurality of authentication requests when the user device 104 is within the first range of the access control device 106. Further, the UWB communication technique of the present disclosure may utilize the UWB system 124 and the second secure element 122 of the user device 104 to provide the plurality of authentication responses to the access control device 106 to facilitate mutual authentication of the access control device 106 and the user device 104. Based on the successful mutual authentication, the access control device 106 may generate the plurality of first transaction payloads. Further, based on the plurality of first transaction payloads, the access control device 106 may determine when the user 102 is within the transaction area to confirm the intent of the user 102 for the access control operation. Thus, a need for generating prompts for the user 102 to confirm the intent is eliminated, thereby providing a seamless experience to the user 102 for the access control operation. Further, as the session identifier is provided by the UWB system 124 to the second secure element 122, the UWB environment 100 eliminates a need for the UWB system 124 to communicate with the host processor 120 for providing the session identifier to the second secure element 122.

The access control device 106 may directly interact with the UWB system 124 upon the transition of the UWB system 124 to the normal mode. Thus, an involvement of the host processor 120 in the access control operation is minimized as the plurality of first transaction payloads and the plurality of first transaction responses are communicated directly between the UWB system 124 and the second secure element 122. As the involvement of the host processor 120 is minimized, a processing overhead of the host processor 120 is reduced as compared to conventional mechanisms that involve a processor in the exchange of payloads and responses (e.g., session tokens). Thus, the host processor 120 may be available to handle additional tasks of the user device 104. The reduction in processing overhead results in a substantial reduction in the time required for the access control operation. Thus, the user 102 may be able to quickly access the public transportation.

In an embodiment of the present disclosure, a UWB system of a user device is disclosed. The UWB system may comprise a UWB processor. The UWB processor may be configured to provide to a secure element of the user device, a session identifier associated with a first session key based on reception of the session identifier from an access control device. The first session key may be generated by the access control device to facilitate an access control operation for the user device. The first session key may be generated by the access control device and a second session key may be generated by the secure element when a mutual authentication between the user device and the access control device is successful. The UWB processor may be further configured to schedule a secure data exchange session between the user device and the access control device. The secure data exchange session may be scheduled based on the first session key and the second session key. The UWB processor may be further configured to receive, during the secure data exchange session, the plurality of first transaction payloads from the access control device. Each of the plurality of first transaction payloads may include the session identifier. The UWB processor may be further configured to request, a ranging payload set from the secure element based on the plurality of first transaction payloads. The ranging payload set may include the second session key and the session identifier. The UWB processor may be further configured to decrypt, based on the ranging payload set, each of the plurality of first transaction payloads to generate a plurality of second transaction payloads. The access control operation may be executed based on the plurality of second transaction payloads.

In some embodiments, when the user device is within a first range of the access control device, a setup message is received by a host processor of the user device from the access control device, the UWB processor may be further configured to receive a set of setup signals from the host processor. The set of setup signals may be generated based on the setup message. The UWB processor may be further configured to perform a transition of the UWB system from a low power mode to a normal mode based on the reception of the set of setup signals. Further, the mutual authentication between the user device and the access control device may be initiated, based on the transitioning of the UWB system to the normal mode.

In some embodiments, the UWB system may further comprise a memory. The UWB processor may be further configured to store the ranging payload set received from the secure element in the memory. The ranging payload set may be erased from the secure element upon providing the ranging payload set to the UWB system. The UWB processor may be further configured to generate a payload key based on the ranging payload set received from the secure element. The payload key may be utilized to decrypt the plurality of first transaction payloads to generate the plurality of second transaction payloads.

In some embodiments, the UWB processor may be further configured to provide the plurality of second transaction payloads to the secure element. The UWB processor may be further configured to receive, upon providing the plurality of second transaction payloads, a plurality of first transaction responses from the secure element. The plurality of first transaction responses may be generated by the secure element based on the plurality of second transaction payloads. The UWB processor may be further configured to encrypt, based on the payload key, each of the plurality of first transaction responses to generate a plurality of second transaction responses.

In some embodiments, the first session key and the second session key may be identical such that an encryption of a plurality of first transaction requests by the access control device may be identical to the encryption of the plurality of first transaction responses by the UWB system. The plurality of first transaction requests may be encrypted to generate the plurality of first transaction payloads. The plurality of first transaction requests may be generated by the access control device when the user device is within a transaction area of the access control device. The plurality of first transaction responses may be provided by the secure element to the UWB system based on the plurality of second transaction payloads.

In some embodiments, the UWB processor may be further configured to transmit the plurality of second transaction responses to the access control device. The UWB processor may be further configured to receive a transaction signal, from the access control device based on the transmission of the plurality of second transaction responses to the access control device. The transaction signal may be generated by the access control device based on the processing of the plurality of second transaction responses. The UWB processor may be further configured to provide, the transaction signal to the secure element, wherein the access control operation may be detected to be successful by the secure element based on reception of the transaction signal by the secure element.

In some embodiments, the UWB processor may be further configured to erase the second session key from the memory based on the reception of the transaction signal from the access control device.

In some embodiments, each of the plurality of second transaction responses may include a first value. The first value may be utilized by the access control device to determine when the user device is within a transaction area of the access control device, and the access control operation may be executed when the user device is within the transaction area of the access control device.

In some embodiments, the plurality of first transaction payloads may be received by the UWB processor when the user device is detected to be within a transaction area of the access control device.

In some embodiments, the UWB processor may be further configured to receive a plurality of authentication requests from the access control device when the user device is detected to be within a first range of the access control device. The plurality of authentication requests may be generated to initiate the mutual authentication between the user device and the access control device. The UWB processor may be further configured to provide the plurality of authentication requests to the secure element. A plurality of authentication responses may be generated by the secure element, based on the plurality of authentication requests.

In some embodiments, the UWB processor may be further configured to transmit the plurality of authentication responses to the access control device. The UWB processor may be further configured to receive based on the transmission of the plurality of authentication responses, a status signal, from the access control device. The status signal may be generated by the access control device based on processing of the plurality of authentication responses.

In some embodiments, the UWB processor may be further configured to generate, a query signal based on the status signal. The UWB processor may be further configured to provide the query signal to the secure element to confirm a presence of the second session key in the secure element. The UWB processor may be further configured to receive, a confirmation signal from the secure element. The confirmation signal may be generated by the secure element based on the query signal confirming the presence of the second session key in the secure element. The UWB processor may be configured to detect that the mutual authentication is successful based on the confirmation signal. The UWB processor may be further configured to receive the session identifier associated with the first session key from the access control device when the mutual authentication may be detected to be successful.

In another embodiment of the present disclosure, a UWB communication method is disclosed. The UWB communication method may comprise providing, by a UWB system of a user device, to a secure element of the user device, a session identifier associated with a first session key that is received from an access control device. The first session key may be generated by the access control device to facilitate an access control operation for the user device. The first session key may be generated by the access control device and a second session key may be generated by the secure element when a mutual authentication between the user device and the access control device is successful. The UWB communication method may further comprise scheduling, by the UWB system, a secure data exchange session between the user device and the access control device. The secure data exchange session may be scheduled based on the first session key and the second session key. The UWB communication method may further comprise receiving, by the UWB system, during the secure data exchange session, a plurality of first transaction payloads from the access control device. Each of the plurality of first transaction payloads may include the session identifier. The UWB communication method may further comprise requesting, by the UWB system, a ranging payload set from the secure element based on the plurality of first transaction payloads. The ranging payload set may include the second session key and the session identifier. The UWB communication method may comprise decrypting, by the UWB system, based on the ranging payload set, each of the plurality of first transaction payloads to generate a plurality of second transaction payloads. The access control operation may be executed based on the plurality of second transaction payloads.

In some embodiments, the UWB communication method may further comprise receiving, by the UWB system, a set of setup signals from a host processor of the user device. The set of setup signals may be received from the host processor based on the user device being within a first range of the access control device. The UWB communication method may further comprise performing a transition, by the UWB system, from a low power mode to a normal mode based on the reception of the set of setup signals. The mutual authentication between the user device and the access control device may be initiated based on the transition of the UWB system to the normal mode.

In some embodiments, the UWB communication method may further comprise storing by the UWB system, the ranging payload set received from the secure element, in a memory of the UWB system. The ranging payload set may be erased from the secure element upon providing the ranging payload set to the UWB system. The UWB communication method may further comprise generating, by the UWB system, a payload key based on the ranging payload set received from the secure element. The payload key may be utilized to decrypt the plurality of first transaction payloads to generate the plurality of second transaction payloads.

In some embodiments, the UWB communication method may further comprise providing, by the UWB system, the plurality of second transaction payloads to the secure element. The UWB communication method may further comprise receiving, by the UWB system, upon providing the plurality of second transaction payloads, a plurality of first transaction responses from the secure element. The plurality of first transaction responses may be generated by the secure element based on the plurality of second transaction payloads. The UWB communication method may further comprise encrypting, by the UWB system, based on the payload key, each of the plurality of first transaction responses to generate a plurality of second transaction responses.

In some embodiments, the UWB communication method may further comprise transmitting, by the UWB system, the plurality of second transaction responses to the access control device. The UWB communication method may further comprise receiving, by the UWB system, a transaction signal, from the access control device based on the transmission of the plurality of second transaction responses to the access control device. The transaction signal may be generated by the access control device based on processing of the plurality of second transaction responses. The UWB communication method may further comprise providing by the UWB system, the transaction signal to the secure element. The access control operation may be detected to be successful by the secure element based on the reception of the transaction signal by the secure element. The UWB communication method may further comprise erasing by the UWB system, the second session key from the memory of the UWB system, based on the reception of the transaction signal from the access control device.

In some embodiments, the UWB communication method may further comprise receiving, by the UWB system, a plurality of authentication requests from the access control device when the user device is detected to be within a first range of the access control device. The plurality of authentication requests may be generated to initiate the mutual authentication between the user device and the access control device. The UWB communication method may further comprise providing, by the UWB system, the plurality of authentication requests to the secure element. A plurality of authentication responses may be generated by the secure element based on the plurality of authentication requests.

In some embodiments, the UWB communication method may further comprise transmitting, by the UWB system, the plurality of authentication responses to the access control device. The UWB communication method may further comprise receiving, a status signal, by the UWB system from the access control device. The status signal may be generated by the access control device based on processing of the plurality of authentication responses.

In some embodiments, the UWB communication method may further comprise generating, by the UWB system, a query signal. The UWB communication method may further comprise providing, by the UWB system, the query signal to the secure element to confirm a presence of the second session key in the secure element. The UWB communication method may further comprise receiving, by the UWB system, a confirmation signal from the secure element. The confirmation signal may be generated by the secure element based on the query signal confirming the presence of the second session key in the secure element. The UWB communication method may further comprise detecting, by the UWB system, that the mutual authentication is successful based on the confirmation signal. The UWB communication method may further comprise receiving, by the UWB system, the session identifier associated with the first session key from the access control device when the mutual authentication may be detected to be successful.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. An ultra-wideband (UWB) system of a user device, wherein the UWB system comprises:
   a UWB processor configured to:
      provide to a secure element of the user device, a session identifier associated with a first session key based on reception of the session identifier from an access control device, wherein the first session key is generated by the access control device to facilitate an access control operation for the user device, and wherein the first session key is generated by the access control device and a second session key is generated by the secure element when a mutual authentication between the user device and the access control device is successful;
   schedule a secure data exchange session between the user device and the access control device, wherein the secure data exchange session is scheduled based on the first session key and the second session key;
   receive during the secure data exchange session, a plurality of first transaction payloads from the access control device, wherein each of the plurality of first transaction payloads includes the session identifier and each of the plurality of first transaction payloads is encrypted;
   request a ranging payload set from the secure element based on the plurality of first transaction payloads, wherein the ranging payload set includes the second session key and the session identifier; and
   decrypt based on the ranging payload set, each of the plurality of first transaction payloads to generate a plurality of second transaction payloads, wherein the access control operation is executed based on the plurality of second transaction payloads.

2. The UWB system of claim 1, wherein when the user device is within a first range of the access control device, a setup message is received by a host processor of the user device from the access control device, and wherein the UWB processor is further configured to:
   receive a set of setup signals from the host processor, wherein the set of setup signals is generated based on the setup message; and
   perform a transition of the UWB system from a low power mode to a normal mode based on the reception of the set of setup signals, wherein the mutual authentication between the user device and the access control device is initiated based on the transition of the UWB system to the normal mode.

3. The UWB system of claim 1, further comprising a memory, wherein the UWB processor is further configured to:
   store the ranging payload set received from the secure element in the memory, wherein the ranging payload set is erased from the secure element upon providing the ranging payload set to the UWB system; and
   generate a payload key based on the ranging payload set received from the secure element, wherein the payload key is utilized to decrypt the plurality of first transaction payloads to generate the plurality of second transaction payloads.

4. The UWB system of claim 3, wherein the UWB processor is further configured to:
   provide the plurality of second transaction payloads to the secure element;
   receive upon providing the plurality of second transaction payloads, a plurality of first transaction responses from the secure element, wherein the plurality of first transaction responses are generated by the secure element based on the plurality of second transaction payloads; and
   encrypt based on the payload key, each of the plurality of first transaction responses to generate a plurality of second transaction responses.

5. The UWB system of claim 4, wherein the first session key and the second session key are identical such that an encryption of a plurality of first transaction requests by the access control device is identical to the encryption of the plurality of first transaction responses by the UWB system, wherein the plurality of first transaction requests are encrypted to generate the plurality of first transaction payloads, wherein the plurality of first transaction requests are generated by the access control device when the user device is within a transaction area of the access control device, and wherein the plurality of first transaction responses are provided by the secure element to the UWB system based on the plurality of second transaction payloads.

6. The UWB system of claim 4, wherein the UWB processor is further configured to:

transmit the plurality of second transaction responses to the access control device;

receive a transaction signal from the access control device based on the transmission of the plurality of second transaction responses to the access control device, wherein the transaction signal is generated by the access control device based on processing of the plurality of second transaction responses; and provide the transaction signal to the secure element, wherein the access control operation is detected to be successful by the secure element based on reception of the transaction signal by the secure element.

7. The UWB system of claim 6, wherein the UWB processor is further configured to erase the second session key from the memory, based on the reception of the transaction signal from the access control device.

8. The UWB system of claim 4, wherein each of the plurality of second transaction responses includes a first value, wherein the first value is utilized by the access control device to determine when the user device is within a transaction area of the access control device, and wherein the access control operation is executed when the user device is within the transaction area of the access control device.

9. The UWB system of claim 1, wherein the plurality of first transaction payloads is received by the UWB processor when the user device is detected to be within a transaction area of the access control device.

10. The UWB system of claim 1, wherein the UWB processor is further configured to:

receive a plurality of authentication requests from the access control device when the user device is detected to be within a first range of the access control device, wherein the plurality of authentication requests are generated to initiate the mutual authentication between the user device and the access control device; and provide the plurality of authentication requests to the secure element, wherein a plurality of authentication responses are generated by the secure element, based on the plurality of authentication requests.

11. The UWB system of claim 10, wherein the UWB processor is further configured to:

transmit the plurality of authentication responses to the access control device; and receive based on the transmission of the plurality of authentication responses, a status signal from the access control device, wherein the status signal is generated by the access control device based on processing of the plurality of authentication responses.

12. The UWB system of claim 11, wherein the UWB processor is further configured to:

generate a query signal based on the status signal;

provide the query signal to the secure element to confirm a presence of the second session key in the secure element;

receive a confirmation signal from the secure element, wherein the confirmation signal is generated by the secure element based on the query signal confirming the presence of the second session key in the secure element;

detect that the mutual authentication is successful based on the confirmation signal; and receive the session identifier associated with the first session key from the access control device when the mutual authentication is detected to be successful.

13. An ultra-wideband (UWB) communication method comprising:

providing, by a UWB system of a user device to a secure element of the user device, a session identifier associated with a first session key that is received from an access control device, wherein the first session key is generated by the access control device to facilitate an access control operation for the user device, and wherein the first session key is generated by the access control device and a second session key is generated by the secure element when a mutual authentication between the user device and the access control device is successful;

scheduling, by the UWB system, a secure data exchange session between the user device and the access control device, wherein the secure data exchange session is scheduled based on the first session key and the second session key;

receiving, by the UWB system during the secure data exchange session, a plurality of first transaction payloads from the access control device, wherein each of the plurality of first transaction payloads includes the session identifier and each of the plurality of first transaction payloads is encrypted;

requesting, by the UWB system, a ranging payload set from the secure element based on the plurality of first transaction payloads, wherein the ranging payload set includes the second session key and the session identifier; and decrypting, by the UWB system based on the ranging payload set, each of the plurality of first transaction payloads to generate a plurality of second transaction payloads, wherein the access control operation is executed based on the plurality of second transaction payloads.

14. The UWB communication method of claim 13, further comprising:

receiving, by the UWB system, a set of setup signals from a host processor of the user device, wherein the set of setup signals is received from the host processor based on the user device being within a first range of the access control device; and performing a transition, by the UWB system from a low power mode to a normal mode based on the reception of the set of setup signals, wherein the mutual authentication between the user device and the access control device is initiated based on the transition of the UWB system to the normal mode.

15. The UWB communication method of claim 13, further comprising:

storing, by the UWB system, the ranging payload set received from the secure element in a memory of the UWB system, wherein the ranging payload set is erased from the secure element upon providing the ranging payload set to the UWB system; and generating, by the UWB system, a payload key based on the ranging payload set received from the secure element, wherein the payload key is utilized to decrypt the plurality of first transaction payloads to generate the plurality of second transaction payloads.

16. The UWB communication method of claim 15, further comprising:

providing, by the UWB system, the plurality of second transaction payloads to the secure element;

receiving, by the UWB system upon providing the plurality of second transaction payloads, a plurality of first transaction responses from the secure element, wherein the plurality of first transaction responses are generated by the secure element based on the plurality of second transaction payloads; and encrypting, by the UWB system based on the payload key, each of the plurality of first transaction responses to generate a plurality of second transaction responses.

17. The UWB communication method of claim 16, further comprising:

transmitting, by the UWB system, the plurality of second transaction responses to the access control device;

receiving, by the UWB system, a transaction signal from the access control device based on the transmission of the plurality of second transaction responses to the access control device, wherein the transaction signal is generated by the access control device based on processing of the plurality of second transaction responses;

providing by the UWB system, the transaction signal to the secure element, wherein the access control operation is detected to be successful by the secure element based on reception of the transaction signal by the secure element; and erasing by the UWB system, the second session key from the memory of the UWB system based on the reception of the transaction signal from the access control device.

18. The UWB communication method of claim 13, further comprising:

receiving, by the UWB system, a plurality of authentication requests from the access control device when the user device is detected to be within a first range of the access control device, wherein the plurality of authentication requests are generated to initiate the mutual authentication between the user device and the access control device; and providing, by the UWB system, the plurality of authentication requests to the secure element, wherein a plurality of authentication responses are generated by the secure element, based on the plurality of authentication requests.

19. The UWB communication method of claim 18, further comprising:

transmitting, by the UWB system, the plurality of authentication responses to the access control device; and receiving a status signal, by the UWB system from the access control device, wherein the status signal is generated by the access control device based on processing of the plurality of authentication responses.

20. The UWB communication method of claim 19, further comprising:

generating, by the UWB system, a query signal;

providing, by the UWB system, the query signal to the secure element to confirm a presence of the second session key in the secure element;

receiving, by the UWB system, a confirmation signal from the secure element, wherein the confirmation signal is generated by the secure element based on the query signal confirming the presence of the second session key in the secure element;

detecting, by the UWB system, that the mutual authentication is successful based on the confirmation signal; and receiving, by the UWB system, the session identifier associated with the first session key from the access control device when the mutual authentication is detected to be successful.

* * * * *